United States Patent
Nakayama

(10) Patent No.: US 10,936,133 B2
(45) Date of Patent: Mar. 2, 2021

(54) TOUCH PANEL INCLUDING CONDUCTIVE MEMBER HAVING ELECTRODES CONFIGURED TO ENHANCE VISIBILITY

(71) Applicant: FUJIFILM Corporation, Tokyo (JP)

(72) Inventor: Masaya Nakayama, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/851,657

(22) Filed: Apr. 17, 2020

(65) Prior Publication Data

US 2020/0285348 A1  Sep. 10, 2020

Related U.S. Application Data

(63) Continuation of application No. PCT/JP2018/037713, filed on Oct. 10, 2018.

(30) Foreign Application Priority Data

Nov. 13, 2017 (JP) .............................. JP2017-218323

(51) Int. Cl.
*G06F 3/044* (2006.01)
*G06F 3/047* (2006.01)

(52) U.S. Cl.
CPC ............ *G06F 3/0445* (2019.05); *G06F 3/047* (2013.01); *G06F 3/0448* (2019.05); *G06F 2203/04112* (2013.01)

(58) Field of Classification Search
CPC ......... G06F 2203/04112; G06F 3/0445; G06F 3/0446; G06F 3/0448; G06F 3/047
See application file for complete search history.

(56) References Cited

U.S. PATENT DOCUMENTS

| | | | | |
|---|---|---|---|---|
| 2013/0169548 A1* | 7/2013 | Kim | ...................... | G06F 3/0446 345/173 |
| 2014/0299361 A1* | 10/2014 | Nakamura | ........... | H05K 1/0296 174/253 |
| 2014/0320760 A1* | 10/2014 | Ishizaki | .................. | G06F 3/047 349/12 |

(Continued)

FOREIGN PATENT DOCUMENTS

| | | |
|---|---|---|
| JP | 2017-004519 A | 1/2017 |
| WO | 2013/094729 A | 6/2013 |

OTHER PUBLICATIONS

International Search Report Issued in PCT/JP2018/037713 dated Dec. 25, 2018.

(Continued)

*Primary Examiner* — Chun-Nan Lin
(74) *Attorney, Agent, or Firm* — Edwards Neils LLC; Jean C. Edwards, Esq.

(57) ABSTRACT

A conductive member includes a first sensing electrode, a first dummy electrode, a second sensing electrode, and a second dummy electrode, each of which is constituted by a plurality of mesh cells formed with fine metal wires, the mesh cells of the first dummy electrode and the second dummy electrode have disconnection portions and, and in plan view, a fine metal wire of the second sensing electrode is disposed at the disconnection portion of the first dummy electrode, and a fine metal wire of the first sensing electrode is disposed at the disconnection portion of the second dummy electrode.

19 Claims, 11 Drawing Sheets

(56) References Cited

U.S. PATENT DOCUMENTS

| | | | | |
|---|---|---|---|---|
| 2014/0333555 | A1* | 11/2014 | Oh | G06F 3/0446 |
| | | | | 345/173 |
| 2015/0116252 | A1* | 4/2015 | Park | G06F 3/0445 |
| | | | | 345/173 |
| 2015/0286323 | A1* | 10/2015 | Iwami | G06F 3/0446 |
| | | | | 345/174 |
| 2015/0363024 | A1* | 12/2015 | Hayashi | G06F 3/0446 |
| | | | | 345/174 |
| 2020/0117301 | A1* | 4/2020 | Nakayama | G06F 3/047 |

OTHER PUBLICATIONS

Written Opinion Issued in PCT/JP2018/037713 dated Dec. 25, 2018.
International Preliminary Report on Patentability Issued in PCT/JP2018/037713 dated Oct. 25, 2019.

* cited by examiner

TOUCH PANEL INCLUDING CONDUCTIVE MEMBER HAVING ELECTRODES CONFIGURED TO ENHANCE VISIBILITY

CROSS-REFERENCE TO RELATED APPLICATIONS

This application is a Continuation of PCT International Application No. PCT/JP2018/37713, filed on Oct. 10, 2018, which was published under PCT Article 21(2) in Japanese, and which claims priority under 35 U.S.C. § 119(a) to Japanese Patent Application No. 2017-218323, filed on Nov. 13, 2017. The above applications are hereby expressly incorporated by reference, in their entirety, into the present application.

BACKGROUND OF THE INVENTION

1. Field of the Invention

The present invention relates to a conductive member including a sensing electrode constituted by a fine metal wire, and a touch panel comprising the conductive member.

2. Description of the Related Art

In recent years, in various electronic devices including portable information devices such as tablet computers and smart phones, a touch panel which is used in combination with display devices such as liquid crystal display devices and which performs an input operation on an electronic device by causing a finger, a stylus pen, or the like to be in contact with or be close to a screen is widespread.

A touch panel normally includes a conductive member in which a plurality of sensing electrodes or the like for detecting a touch operation with a finger, a stylus pen, or the like are formed. The sensing electrode is usually formed of a transparent conductive oxide such as indium tin oxide (ITO), but is also formed of metal other than the transparent conductive oxide. Compared to the transparent conductive oxide, metal has advantages such as easy patterning, excellent flexibility, and a lower resistance value. In a touch panel including a conductive member constituted using a fine metal wire, it is possible to reduce a resistance value and a parasitic capacitance value compared to a touch panel of the related art configured using a transparent conductive oxide, and thus it is possible to improve detection sensitivity for a touch operation and this touch panel attracts attention.

For example, WO2013/094729A discloses a conductive sheet for a touch panel which includes a plurality of mesh-like sensing electrodes (conductive pattern) formed with fine metal wires. In the conductive sheet for a touch panel disclosed in WO2013/094729A, a plurality of dummy electrodes (non-conductive pattern) which are electrically insulated from the plurality of sensing electrodes are formed between the plurality of sensing electrodes (conductive pattern). Further, the plurality of sensing electrodes (conductive pattern) and the plurality of dummy electrodes (non-conductive pattern) have a mesh shape constituted by the plurality of rhombic mesh cells, and mesh cells of the plurality of dummy electrodes (non-conductive pattern) have a disconnection portion where a fine metal wire is discontinuous.

As described above, in general, the conductive sheet for a touch panel, which includes the plurality of sensing electrodes (conductive pattern) and the plurality of dummy electrodes (non-conductive pattern) and has the disconnection portion in the plurality of dummy electrodes (non-conductive pattern), has a configuration as shown FIGS. 11 to 13 in many cases. For example, a first electrode layer 1A as shown in FIG. 11 and a second electrode layer 1B as shown in FIG. 12 are formed via a transparent insulating member (not shown). As shown in FIG. 11, a sensing electrode 2A which is formed with fine metal wires 6 and extends along a second direction D2 is formed on the first electrode layer 1A. Moreover, in order to prevent a gap between the plurality of sensing electrodes 2A from being conspicuously visually recognized, a plurality of dummy electrodes 3A which do not contribute to detection of a touch operation are formed between the plurality of sensing electrodes 2A. Furthermore, in the first electrode layer 1A, the plurality of sensing electrodes 2A and the plurality of dummy electrodes 3A are constituted by the plurality of rhombic mesh cells 4A, and a disconnection portion 5A where the fine metal wire 6 is discontinuous is provided at midpoints of sides of the respective mesh cells 4A constituting the plurality of dummy electrodes 3A.

In addition, as shown in FIG. 12, a sensing electrode 2B which is formed with the fine metal wires 6 and extends along a first direction D1 is formed on the second electrode layer 1B. Moreover, similarly to the plurality of dummy electrodes 3A of the first electrode layer 1A, a plurality of dummy electrodes 3B are formed between the plurality of sensing electrodes 2B. In the second electrode layer 1B, the plurality of sensing electrodes 2B and the plurality of dummy electrodes 3B are constituted by the plurality of rhombic mesh cells 4B, and a disconnection portion 5B where the fine metal wire 6 is discontinuous is provided at midpoints of sides of the respective mesh cells 4B constituting the plurality of dummy electrodes 3B.

SUMMARY OF THE INVENTION

However, since in the dummy electrodes 3A and 3B shown as examples in FIGS. 11 and 12, the disconnection portions 5A and 5B are respectively provided at midpoints of sides of the plurality of mesh cells 4A and 4B, as shown in FIG. 13, in a case where the conductive member is viewed from the viewing side in a state where the first electrode layer 1A and the second electrode layer 1B are overlapped with each other, the disconnection portions 5A of the plurality of dummy electrodes 3A formed on the first electrode layer 1A and the disconnection portions 5B of the plurality of dummy electrodes 3B formed on the second electrode layer 1B are disposed at the same place. Accordingly, a plurality of places where the disconnection portions 5A and 5B are overlapped with each other are conspicuously visually recognized, and thus in a case where the conductive sheet for a touch panel having a configuration as shown in FIGS. 11 to 13 is used for a touch panel, a visibility may be reduced.

The present invention has been made to solve such a problem in the related art, and an object thereof is to provide a conductive member capable of improving a visibility and a touch panel comprising the conductive member.

A first conductive member according to the present invention comprises a first electrode layer and a second electrode layer which are disposed via a transparent insulating member, in which the first electrode layer includes a plurality of first sensing electrodes which are arranged in parallel at an interval in a first direction and each extend in a second direction orthogonal to the first direction, and a plurality of first dummy electrodes which are arranged between the plurality of first sensing electrodes and are insulated from the plurality of first sensing electrodes, the second electrode layer includes a plurality of second sensing electrodes which are arranged in parallel at an interval in the second direction and each extend in the first direction, and a plurality of second dummy electrodes which are arranged between the plurality of second sensing electrodes and are insulated from the plurality of second sensing electrodes, each of the first sensing electrodes, the first dummy electrodes, the second sensing electrodes, and the second dummy electrodes is constituted by a plurality of mesh cells formed with a fine metal wire, each of the mesh cells constituting the first dummy electrodes has a disconnection portion where the fine metal wire is discontinuous, each of the mesh cells constituting the second dummy electrodes has a disconnection portion where the fine metal wire is discontinuous, a disposition of the disconnection portion of the mesh cell of the first dummy electrode in a region where the first dummy electrode and the second sensing electrode are overlapped with each other is different from a disposition of the disconnection portion of the mesh cell of the first dummy electrode in a region where the first dummy electrode and the second dummy electrode are overlapped with each other, a disposition of the disconnection portion of the mesh cell of the second dummy electrode in a region where the second dummy electrode and the first sensing electrode are overlapped with each other is different from a disposition of the disconnection portion of the mesh cell of the second dummy electrode in a region where the first dummy electrode and the second dummy electrode are overlapped with each other, and in plan view, in a region where the first dummy electrode and the second sensing electrode are overlapped with each other, the fine metal wire of the second sensing electrode is disposed at the disconnection portion of the first dummy electrode, in a region where the second dummy electrode and the first sensing electrode are overlapped with each other, the fine metal wire of the first sensing electrode is disposed at the disconnection portion of the second dummy electrode, and the first dummy electrode and the second dummy electrode are formed such that in a region where the first dummy electrode and the second dummy electrode are overlapped with each other, at least one of a point where the fine metal wire which is not the disconnection portion of the first dummy electrode and is continuous and the fine metal wire which is not the disconnection portion of the second dummy electrode and is continuous are intersected and overlapped with each other or a point where the fine metal wire which is not the disconnection portion of one of the first dummy electrode and the second dummy electrode and is continuous is disposed at the disconnection portion of the other of the first dummy electrode and the second dummy electrode exists.

In a region where the first dummy electrode and the second dummy electrode are overlapped with each other, the fine metal wire of the second dummy electrode is preferably disposed at the disconnection portion of the first dummy electrode and the fine metal wire of the first dummy electrode is preferably disposed at the disconnection portion of the second dummy electrode.

Alternatively, in a region where the first dummy electrode and the second dummy electrode are overlapped with each other, the disconnection portion of the first dummy electrode and the disconnection portion of the second dummy electrode may each be disposed at positions other than a position where the fine metal wire of the first dummy electrode and the fine metal wire of the second dummy electrode are intersected with each other.

A length of the disconnection portion of the first dummy electrode and a length of the disconnection portion of the second dummy electrode in a region where the first dummy electrode and the second dummy electrode are overlapped with each other are preferably shorter than a length of the disconnection portion of the first dummy electrode in a region where the first dummy electrode and the second sensing electrode are overlapped with each other and a length of the disconnection portion of the second dummy electrode in a region where the second dummy electrode and the first sensing electrode are overlapped with each other.

In addition, a line width of the fine metal wire is preferably 0.5 µm or more and 10 µm or less, and the length of the disconnection portion of the first dummy electrode and the length of the disconnection portion of the second dummy electrode are preferably 1 µm or more and 30 µm or less.

the plurality of first sensing electrodes and the plurality of first dummy electrodes may form a first mesh pattern constituted by a plurality of first mesh cells, the plurality of second sensing electrodes and the plurality of second dummy electrodes may form a second mesh pattern constituted by a plurality of second mesh cells, and in a region where the first electrode layer and the second electrode layer are overlapped with each other, the plurality of first sensing electrodes and the plurality of first dummy electrodes may be combined with the plurality of second sensing electrodes and the plurality of second dummy electrodes to form a third mesh pattern constituted by a plurality of third mesh cells.

Furthermore, each of the third mesh cells may have a shape of a quadrangle.

Moreover, the quadrangle is preferably a rhombus.

The first mesh cell and the second mesh cell may have the same shape, the first mesh pattern may have a first mesh pitch, the second mesh pattern may have a second mesh pitch which is the same as the first mesh pitch, and the third mesh cell may have a third mesh pitch which is ½ of the first mesh pitch.

A touch panel according to the present invention comprises the above conductive member.

A second conductive member according to the present invention comprises a first electrode layer and a second electrode layer which are disposed via a transparent insulating member, in which the first electrode layer includes a plurality of first sensing electrodes which are arranged in parallel at an interval in a first direction and each extend in a second direction orthogonal to the first direction, and a plurality of first dummy electrodes which are arranged between the plurality of first sensing electrodes and are insulated from the plurality of first sensing electrodes, the second electrode layer includes a plurality of second sensing electrodes which are arranged in parallel at an interval in the second direction and each extend in the first direction, and a plurality of second dummy electrodes which are arranged between the plurality of second sensing electrodes and are insulated from the plurality of second sensing electrodes, each of the first sensing electrodes, the first dummy electrodes, the second sensing electrodes, and the second dummy electrodes is constituted by a plurality of mesh cells formed with a fine metal wire, each of the mesh cells constituting the first dummy electrodes has a disconnection portion where the fine metal wire is discontinuous, each of the mesh cells constituting the second dummy electrodes has a disconnection portion where the fine metal wire is discontinuous, a disposition of the disconnection portion of the mesh cell of the first dummy electrode in a region where the first dummy electrode and the second sensing electrode are overlapped with each other is different from a disposition of the disconnection portion of the mesh cell of the first dummy electrode in a region where the first dummy electrode and the second dummy electrode are overlapped with each other, and a disposition of the disconnection portion of the mesh cell of the second dummy electrode in a region where the second dummy electrode and the first sensing electrode are overlapped with each other is different from a disposition of the disconnection portion of the mesh cell of the second dummy electrode in a region where the first dummy electrode and the second dummy electrode are overlapped with each other.

According to the present invention, each of the mesh cell constituting the first dummy electrode and the mesh cell constituting the second dummy electrode has the disconnection portion where the fine metal wire is discontinuous, in a region where the first dummy electrode and the second sensing electrode are overlapped with each other, the fine metal wire of the second sensing electrode is disposed at the disconnection portion of the first dummy electrode, in a region where the second dummy electrode and the first sensing electrode are overlapped with each other, the fine metal wire of the first sensing electrode is disposed at the disconnection portion of the second dummy electrode, and the first dummy electrode and the second dummy electrode are formed such that in a region where the first dummy electrode and the second dummy electrode are overlapped with each other, at least one of a point where the fine metal wire which is not the disconnection portion of the first dummy electrode and is continuous and the fine metal wire which is not the disconnection portion of the second dummy electrode and is continuous are intersected and overlapped with each other or a point where the fine metal wire which is not the disconnection portion of one of the first dummy electrode and the second dummy electrode and is continuous is disposed at the disconnection portion of the other of the first dummy electrode and the second dummy electrode exists. Therefore, the disconnection portion of the first dummy electrode and the disconnection portion of the second dummy electrode are not overlapped with each other, and a visibility can be improved.

DESCRIPTION OF THE PREFERRED EMBODIMENTS

Hereinafter, a conductive member according to the present invention will be described in detail based on preferred embodiments shown in the accompanying drawings.

Hereinafter, the expression "to" exhibiting a numerical value range includes numerical values indicated on both sides. For example, "s is a numerical value t1 to a numerical value t2" means that the range of s is a range including the numerical value t1 and the numerical value t2, and in a case of indicating by using mathematical symbols, t1≤s≤t2.

Unless otherwise described, an angle including "orthogonal", "parallel", and the like includes error ranges generally accepted in the art.

"Transparent" means that a light transmittance is at least 40% or more, preferably 75% or more, more preferably 80% or more, and even more preferably 90% or more with respect to the visible light wavelength range of 400 to 800 nm. The light transmittance is measured by using "Plastics—Determination of total luminous transmittance and reflectance" regulated in JIS K 7375:2008.

Embodiment 1

Figure 1:
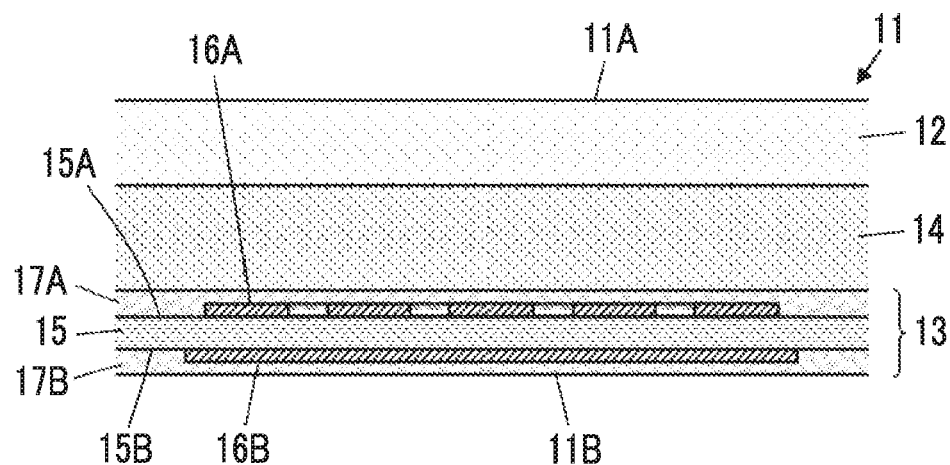
FIG. 1 is a partial cross-sectional view of a touch panel according to Embodiment 1 of the present invention.

FIG. 1 shows a configuration of a touch panel 11 according to Embodiment 1 of the present invention.

The touch panel 11 has a front surface 11A and a back surface 11B, and is used in a state where a display device (not shown) such as a liquid crystal display device is disposed on the back surface 11B side. The front surface 11A of the touch panel 11 is a touch surface for detecting a touch operation, and is a viewing side where an operator of the touch panel 11 observes an image displayed on the display device through the touch panel 11.

The touch panel 11 includes a transparent insulating cover panel 12 disposed on the front surface 1A side, and a conductive member 13 is bonded to a surface of the cover panel 12 opposite to the front surface 11A with a transparent adhesive layer 14.

The conductive member 13 includes a transparent insulating substrate 15 which is a transparent insulating member, and the transparent insulating substrate 15 has a first surface 15A facing a side of the front surface 11A of the touch panel 11 and a second surface 15B facing a side opposite to the first surface 15A. A first electrode layer 16A is formed on the first surface 15A, and a second electrode layer 16B is formed on the second surface 15B of the transparent insulating substrate 15. As shown in FIG. 1, a transparent protective layer 17A covering the first electrode layer 16A and a transparent protective layer 17B covering the second electrode layer 16B may be formed.

Figure 2:
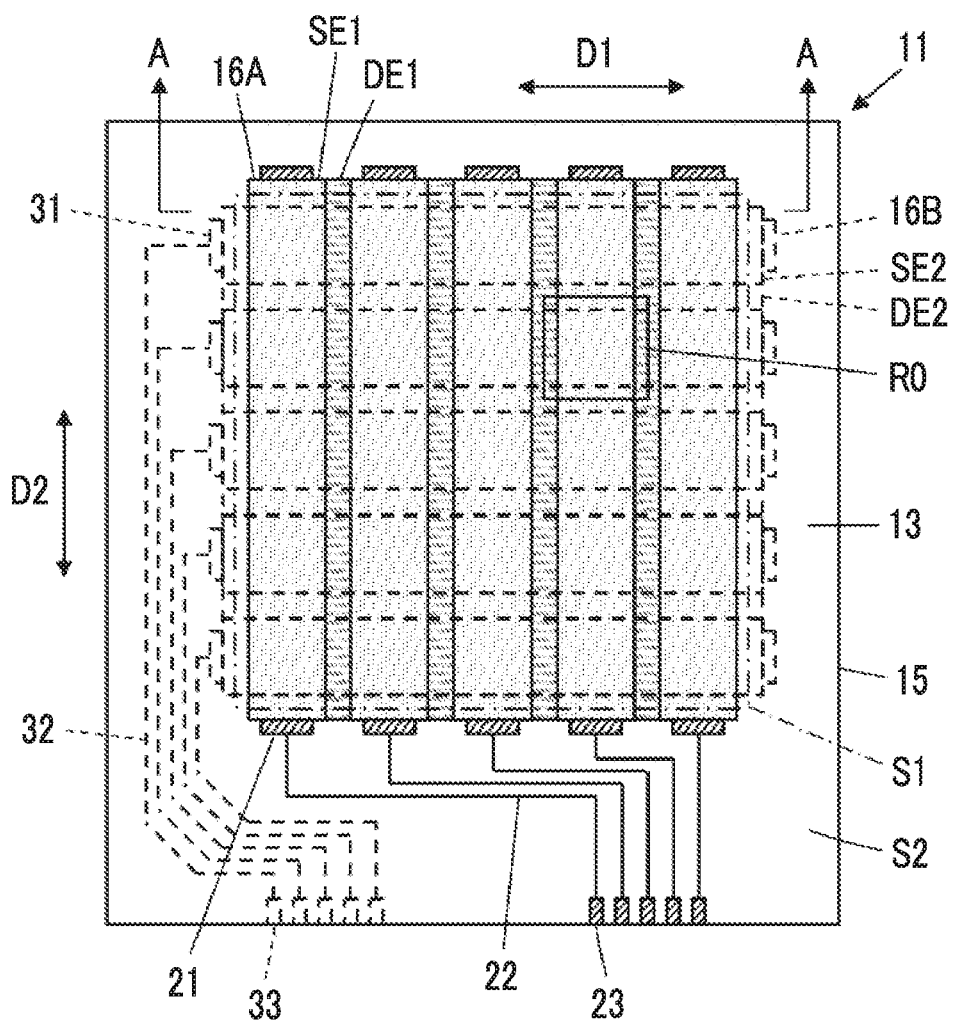
FIG. 2 is a plan view of the touch panel according to Embodiment 1 of the present invention.

FIG. 2 shows a plan view of the touch panel 11 viewed from the viewing side in plan view. FIG. 1 is a cross-sectional view taken along a line A-A in FIG. 2. In addition, in FIG. 2, the cover panel 12, the adhesive layer 14, the protective layer 17A, and the protective layer 17B are omitted for explanation. As shown in FIG. 2, in the conductive member 13 of the touch panel 11, an input region S1 for detecting a touch operation with a finger or a stylus pen is partitioned and an outer region S2 positioned outside the input region S1 is partitioned.

The first electrode layers 16A formed on the first surface 15A of the transparent insulating substrate 15 includes a plurality of first sensing electrodes SE1 which are arranged in parallel at an interval in a first direction D1 and extend along a second direction D2 orthogonal to the first direction D1, and a plurality of first dummy electrodes DE1 which are each disposed between the plurality of first sensing electrodes SE1. The first dummy electrodes DE1 are arranged in order to prevent a phenomenon in which gaps between the plurality of first sensing electrodes SE1 are conspicuous and a pattern of the first sensing electrode SE1 is visually recognized in a case where the touch panel 11 is viewed from the viewing side.

In addition, the first electrode layer 16A further includes a plurality of first electrode pads 21 which are respectively connected to one ends of the plurality of first sensing electrodes SE1, a plurality of first edge part wires 22 which are respectively connected to the plurality of first electrode pads 21, and a plurality of first external connection terminals 23 which are respectively connected to the plurality of first edge part wires 22 and arranged and formed on an edge of the first surface 15A of the transparent insulating substrate 15.

Here, the first sensing electrode SE may comprise the same electrode pad as the first electrode pad 21 even at an end part where the first edge part wire 22 is not electrically connected via the first electrode pad 21. The electrode pad can also be used as a terminal for connecting the first edge part wire 22 and a terminal for inspecting continuity of the first sensing electrode SE1.

The second electrode layer 16B formed on the second surface 15B of the transparent insulating substrate 15 includes a plurality of second sensing electrodes SE2 which are arranged in parallel at an interval in the second direction D2 and extend along the first direction D1, and a plurality of second dummy electrodes DE2 which are each disposed between the plurality of second sensing electrodes SE2. The second dummy electrodes DE2 are arranged in order to prevent a phenomenon in which gaps between the plurality of second sensing electrodes SE2 are conspicuous and a pattern of the second sensing electrode SE2 is visually recognized in a case where the touch panel 11 is viewed from the viewing side.

As shown in FIG. 2, in a case of being viewed from the viewing side, in the input region S1, the plurality of second sensing electrodes SE2 and the plurality of second dummy electrodes DE2 are arranged so as to be intersected and overlapped with the plurality of first sensing electrodes SE1 and the plurality of first dummy electrodes DE1.

In addition, the second electrode layer 16B further includes a plurality of second electrode pads 31 which are respectively connected to one ends of the plurality of second sensing electrodes SE2, a plurality of second edge part wires 32 which are respectively connected to the plurality of second electrode pads 31, and a plurality of second external connection terminals 33 which are respectively connected to the plurality of second edge part wires 32 and arranged and formed on an edge of the second surface 15B of the transparent insulating substrate 15.

Here, the second sensing electrode SE2 may comprise the same electrode pad as the second electrode pad 31 even at an end part where the second edge part wire 32 is not electrically connected via the second electrode pad 31. The electrode pad can also be used as a terminal for connecting the first edge part wire 22 and a terminal for inspecting continuity of the second sensing electrode SE2.

Figure 3:
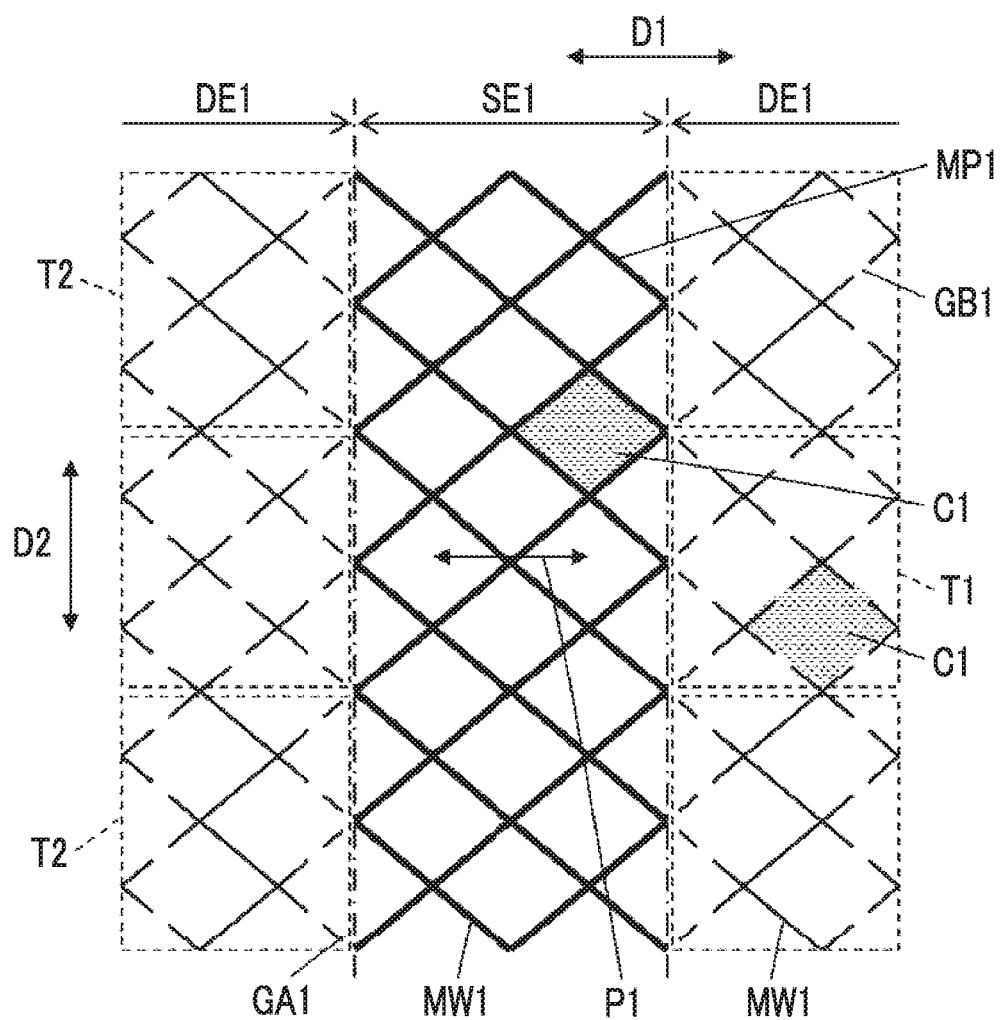
FIG. 3 is a partially enlarged plan view of a first electrode layer in Embodiment 1 of the present invention.

FIG. 3 shows a partial plan view of only the first electrode layer 16A viewed from the viewing side in plan view in a region R0 including a portion where the first sensing electrode SE1 and the second sensing electrode SE2 are overlapped with each other.

As shown in FIG. 3, the first dummy electrode DE1 is formed adjacent to the first sensing electrode SE1.

As shown in FIG. 3, the first sensing electrode SE1 is a mesh-like electrode which is constituted by a fine metal wire MW1 and has a rhombic first mesh cell C1 as a repeating unit.

Moreover, similarly to the first sensing electrode SE1, the first dummy electrode DE1 has a mesh shape which is constituted by the fine metal wire MW1 and has the rhombic first mesh cell C1 as a repeating unit, but the first dummy electrode DE1 is disposed with a gap GA1 so as to be electrically insulated from the first sensing electrode SE1 and also disposed so as to be electrically insulated from the plurality of first electrode pads 21, the plurality of first edge part wires 22, and the plurality of first external connection terminals 23, and thus the first dummy electrode DE1 does not contribute to detection of a touch operation.

Furthermore, for the explanation, in FIG. 3, the fine metal wires MW1 of the first sensing electrode SE1 are drawn by relatively thick solid lines, the fine metal wires MW1 of the first dummy electrode DE1 are drawn by relatively thin solid lines, but in practice, as the fine metal wires MW1 of the first sensing electrode SE1 and the fine metal wires MW1 of the first dummy electrode DE1, fine metal wires MW1 having the same line width can be used.

In addition, each of the plurality of first mesh cells C1 constituting the mesh shape of the first dummy electrode DE1 has a disconnection portion GB1 where the fine metal wire MW1 is discontinuous.

As shown in FIG. 2, the first dummy electrode DE1 is overlapped with the second sensing electrode SE2 and the second dummy electrode DE2, but as shown in FIG. 3, in a portion T1 where the first dummy electrode DE1 and the second sensing electrode SE2 are overlapped with each other, the disconnection portions GB1 are formed at the midpoints of all sides constituting the first mesh cell C1. Moreover, in a portion T2 where the first dummy electrode DE1 and the second dummy electrode DE2 are overlapped with each other, the disconnection portions GB1 are formed at the midpoints of some of sides constituting the first mesh cell C1 and the disconnection portions GB1 are not formed on the other sides. That is, a disposition of a plurality of disconnection portions GB 1 formed in the first dummy electrode DE1 in the portion T1 where the first dummy electrode DE1 and the second sensing electrode SE2 are overlapped with each other is different from a disposition of a plurality of disconnection portions GB1 formed in the first dummy electrode DE1 in the portion T2 where the first dummy electrode DE1 and the second dummy electrode DE2 are overlapped with each other. Furthermore, the difference in the disposition of the disconnection portions means that the number of disconnection portions provided in one mesh cell is different or that the positions of the disconnection portions provided on the sides of the mesh cell are different.

Here, in order to prevent the gap GA1 from being conspicuously visually recognized while ensuring electric insulation properties between the plurality of first dummy electrodes DE1 and the plurality of first sensing electrodes SE1, lengths of the gaps GA1 between the plurality of first dummy electrodes DE1 and the plurality of first sensing electrodes SE1 are preferably 0.5 μm to 50 μm and more preferably 5 μm to 30 μm. Lengths of the disconnection portions GB1 of the plurality of first dummy electrodes DE1 are preferably 0.5 μm to 50 μm, more preferably 1 μm to 30 μm, and even more preferably 5 μm to 20 μm.

As described above, each of the first sensing electrode SE1 and the first dummy electrode DE1 has the first mesh cell C1, and the plurality of first sensing electrodes SE1 and the plurality of first dummy electrodes DE1 form a first mesh pattern MP1 which has the first mesh cell C1 as a repeating unit and has a first mesh pitch P1. Here, the first mesh pitch P1 is defined by a distance between centroids of the first mesh cells C1 adjacent to each other in the first direction D1.

Figure 4:
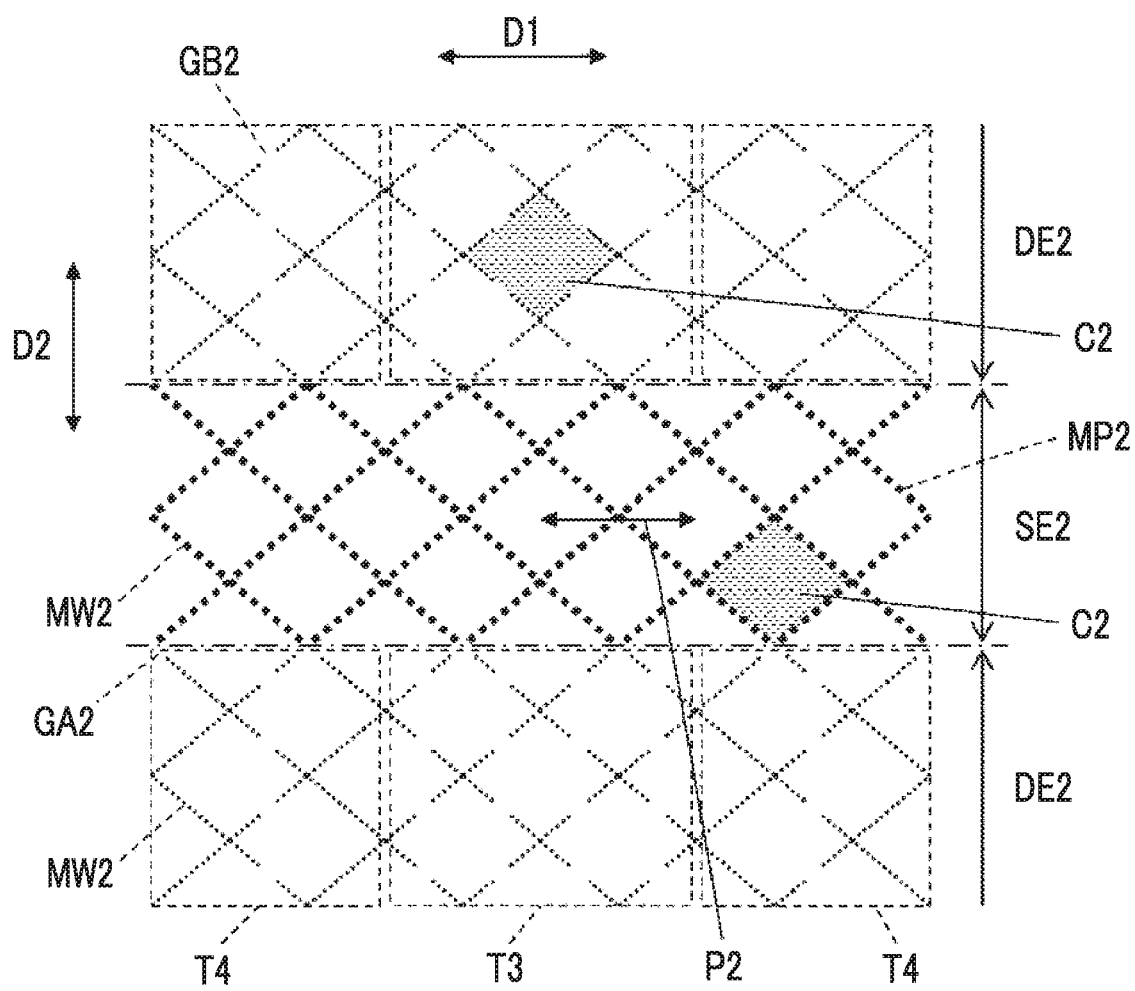
FIG. 4 is a partially enlarged plan view of a second electrode layer in Embodiment 1 of the present invention.

FIG. 4 shows a partial plan view of only the second electrode layer 16B viewed from the viewing side in plan view in the region R0.

As shown in FIG. 4, the second dummy electrode DE2 is formed adjacent to the second sensing electrode SE2. The second dummy electrodes DE2 are arranged in order to prevent a phenomenon in which gaps between the plurality of second sensing electrodes SE2 are conspicuous and a pattern of the second sensing electrode SE2 is visually recognized in a case where the touch panel 11 is viewed from the viewing side.

As shown in FIG. 4, the second sensing electrode SE2 is a mesh-like electrode which is constituted by a fine metal wire MW2 and has a rhombic second mesh cell C2 as a repeating unit.

Moreover, similarly to the second sensing electrode SE2, the second dummy electrode DE2 has a mesh shape which is constituted by the fine metal wire MW2 and has the rhombic second mesh cell C2 as a repeating unit, but the second dummy electrode DE2 is disposed with a gap GA2 so as to be electrically insulated from the second sensing electrode SE2 and also disposed so as to be electrically insulated from the plurality of second electrode pads 31, the plurality of second edge part wires 32, and the plurality of second external connection terminals 33, and thus the second dummy electrode DE2 does not contribute to detection of a touch operation.

Furthermore, for the explanation, in FIG. 4, the fine metal wires MW2 of the second sensing electrode SE2 are drawn by relatively thick dotted lines, the fine metal wires MW2 of the second dummy electrode DE2 are drawn by relatively thin dotted lines, but in practice, the fine metal wires MW2 of the second sensing electrode SE2 and the fine metal wires MW2 of the second dummy electrode DE2 are formed with continuous fine metal wires MW2 and fine metal wires MW2 having the same line width can be used.

In addition, each of the plurality of second mesh cells C2 constituting the mesh shape of the second dummy electrode DE2 has a disconnection portion GB2 where the fine metal wire MW2 is discontinuous.

As shown in FIG. 2, the second dummy electrode DE2 is overlapped with the first sensing electrode SE1 and the first dummy electrode DE1, but as shown in FIG. 4, in a portion T3 where the second dummy electrode DE2 and the first sensing electrode SE1 are overlapped with each other, the disconnection portions GB2 are formed at the midpoints of all sides constituting the second mesh cell C2. Moreover, in a portion T4 where the second dummy electrode DE2 and the first dummy electrode DE1 are overlapped with each other, the disconnection portions GB2 are formed at the midpoints of some of sides constituting the second mesh cell C2 and the disconnection portions GB2 are not formed on the other sides. That is, a disposition of a plurality of disconnection portions GB2 formed in the second dummy electrode DE2 in the portion T3 where the second dummy electrode DE2 and the first sensing electrode SE1 are overlapped with each other is different from a disposition of a plurality of disconnection portions GB2 formed in the second dummy electrode DE2 in the portion T4 where the second dummy electrode DE2 and the first dummy electrode DE1 are overlapped with each other. Furthermore, the difference in the disposition of the disconnection portions means that the number of disconnection portions provided in one mesh cell is different or that the positions of the disconnection portions provided on the sides of the mesh cell are different.

Here, in a case where the first dummy electrode DE1 and the second dummy electrode DE2 are overlapped with each other, the disconnection portion GB2 of the second dummy electrode DE2 is formed at a position different from a position of the disconnection portion GB1 of the first dummy electrode DE1 such that the disconnection portion GB1 of the first dummy electrode DE and the disconnection portion GB2 of the second dummy electrode DE2 are not overlapped with each other.

In addition, in order to prevent the gap GA2 from being conspicuously visually recognized while ensuring electric insulation properties between the plurality of second dummy electrodes DE2 and the plurality of second sensing electrodes SE2, lengths of the gaps GA2 between the plurality of second dummy electrodes DE2 and the plurality of second sensing electrodes SE2 are preferably 0.5 μm to 50 μm and more preferably 5 μm to 30 μm. Lengths of the disconnection portions GB2 of the plurality of second dummy electrodes DE2 are preferably 0.5 μm to 50 μm, more preferably 1 μm to 30 μm, and even more preferably 5 μm to 20 μm.

As described above, each of the second sensing electrode SE2 and the second dummy electrode DE2 has the second mesh cell C2, and the plurality of second sensing electrodes SE2 and the plurality of second dummy electrodes DE2 form a second mesh pattern MP2 which has the second mesh cell C2 as a repeating unit and has a second mesh pitch P2. Here, the second mesh pitch P2 is defined by a distance between centroids of the second mesh cells C2 adjacent to each other in the first direction D1.

Figure 5:
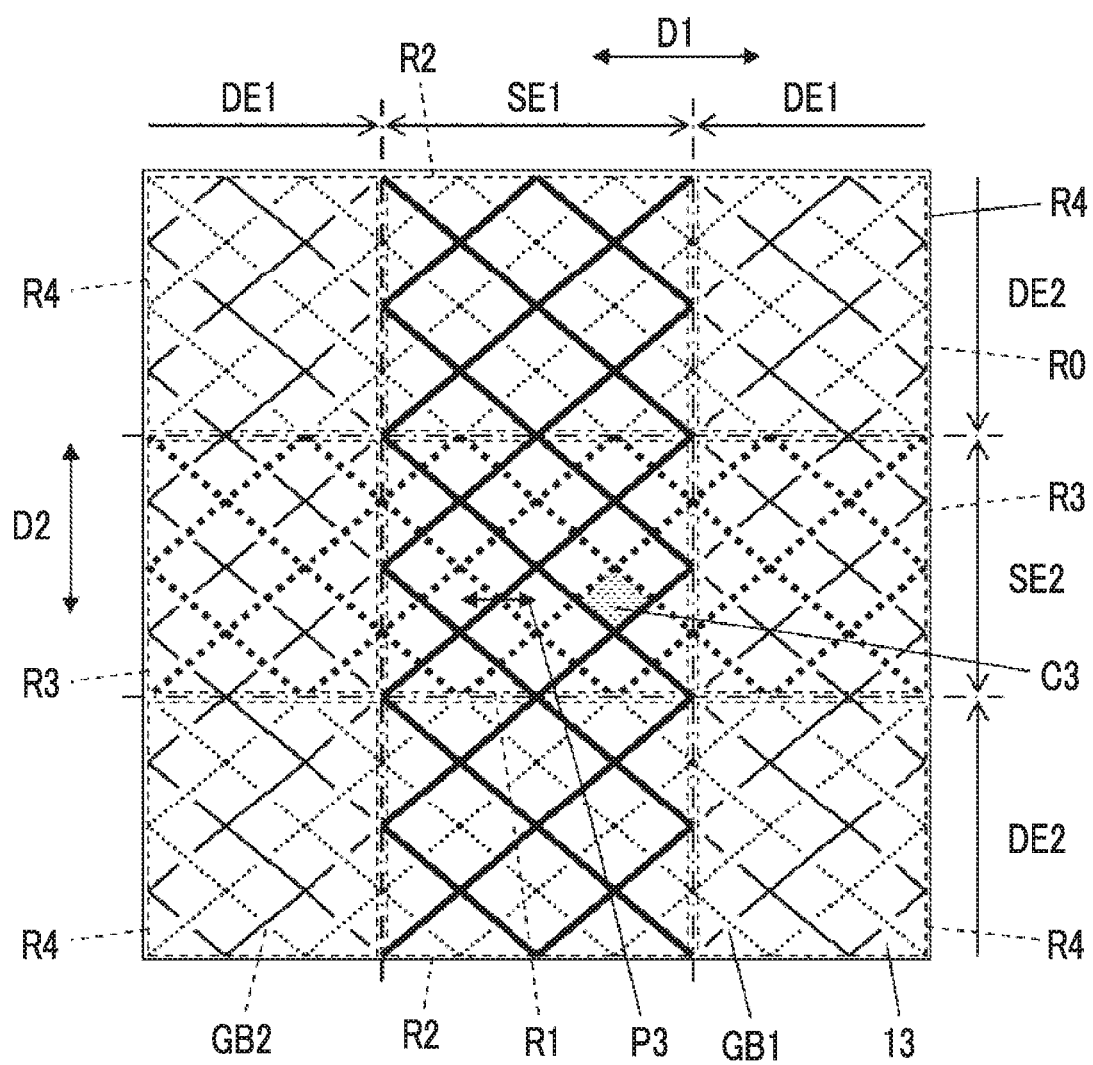
FIG. 5 is a partially enlarged plan view of a conductive member according to Embodiment 1 of the present invention.

FIG. 5 shows a partial plan view of the conductive member 13 viewed from the viewing side in plan view in the region R0. As shown in FIG. 5, in the conductive member 13, the plurality of first sensing electrodes SE1 and the plurality of first dummy electrodes DE1 are combined with the plurality of second sensing electrodes SE2 and the plurality of second dummy electrodes DE2, that is, the first mesh pattern MP1 is combined with the second mesh pattern MP2 to form a third mesh pattern MP3 constituted by a plurality of third mesh cells C3.

Here, as an example of Embodiment 1, in FIG. 5, the first mesh cell C1 and the second mesh cell C2 have the same rhombic shape and the second mesh pattern MP2 is disposed at a position deviated from the first mesh pattern MP1 by ½ of a first mesh pitch P1. In this case, a third mesh pitch P3 of the third mesh pattern MP3 has a value of ½ of the first mesh pitch P1 of the first mesh pattern MP1 and the second mesh pitch P2 of the second mesh pattern MP2, and the third mesh cell C3 also has a rhombic shape.

As described above, by overlapping the first electrode layer 16A and the second electrode layer 16B with each other to form the third mesh pattern MP3 having a third mesh pitch P3, it is possible to reduce a parasitic capacitance in an electrode intersection portion and prevent the fine metal wires included in the first electrode layer 16A and the fine metal wires included in the second electrode layer 16B from being conspicuously visually recognized.

In addition, as shown in FIG. 5, by a combination relating to overlapping of the first sensing electrode SE1, the first dummy electrode DE1, the second sensing electrode SE2, and the second dummy electrode DE2, the region R0 can be divided into four types of regions, which are a first region R1, a second region R2, a third region R3, and a fourth region R4. Here, the first region R1 is a region where the first sensing electrode SE1 and the second sensing electrode SE2 are overlapped with each other, the second region R2 is a region where the first sensing electrode SE1 and the second dummy electrode DE2 are overlapped with each other, the third region R3 is a region where the first dummy electrode DE1 and the second sensing electrode SE2 are overlapped with each other, and the fourth region R4 is a region where the first dummy electrode DE1 and the second dummy electrode DE2 are overlapped with each other.

Furthermore, the second region R2 corresponds to the portion T3 shown in FIG. 4, the third region R3 corresponds to the portion T1 shown in FIG. 3, and the fourth region R4 corresponds to the portion T2 shown in FIG. 3 and the portion T4 shown in FIG. 4.

In a case where the conductive member 13 is viewed from the viewing side, in the first region R1, the fine metal wire constituting the first sensing electrode SE1 and the fine metal wire constituting the second sensing electrode SE2 are intersected and overlapped with each other.

Moreover, in the second region R2, the disconnection portion GB2 of the second dummy electrode DE2 is formed at a midpoint of a side of the second mesh cell C2, and is disposed at a position intersecting with the fine metal wire constituting the first sensing electrode SE1.

Furthermore, in the third region R3, the disconnection portion GB1 of the first dummy electrode DE1 is formed at a midpoint of a side of the first mesh cell C1, and is disposed at a position intersecting with the fine metal wire constituting the second sensing electrode SE2.

In the fourth region R4, each of the disconnection portion GB1 of the first dummy electrode DE1 and the disconnection portion GB2 of the second dummy electrode DE2 is disposed at a position where the fine metal wire of the first dummy electrode DE1 and the fine metal wire of the second dummy electrode DE2 are intersected with each other. At this time, at the position where the disconnection portion GB1 of the first dummy electrode DE1 is disposed, not the disconnection portion GB2 of the second dummy electrode DE2 but the fine metal wire constituting the second dummy electrode DE2 is disposed, and at the position where the disconnection portion GB2 of the second dummy electrode DE2 is disposed, not the disconnection portion GB1 of the first dummy electrode DE1 but the fine metal wire constituting the first dummy electrode DE1 is disposed. Therefore, the plurality of disconnection portions GB1 of the first dummy electrode DE1 and the plurality of disconnection portions GB2 of the second dummy electrode DE2 are not overlapped with each other.

Figure 13:
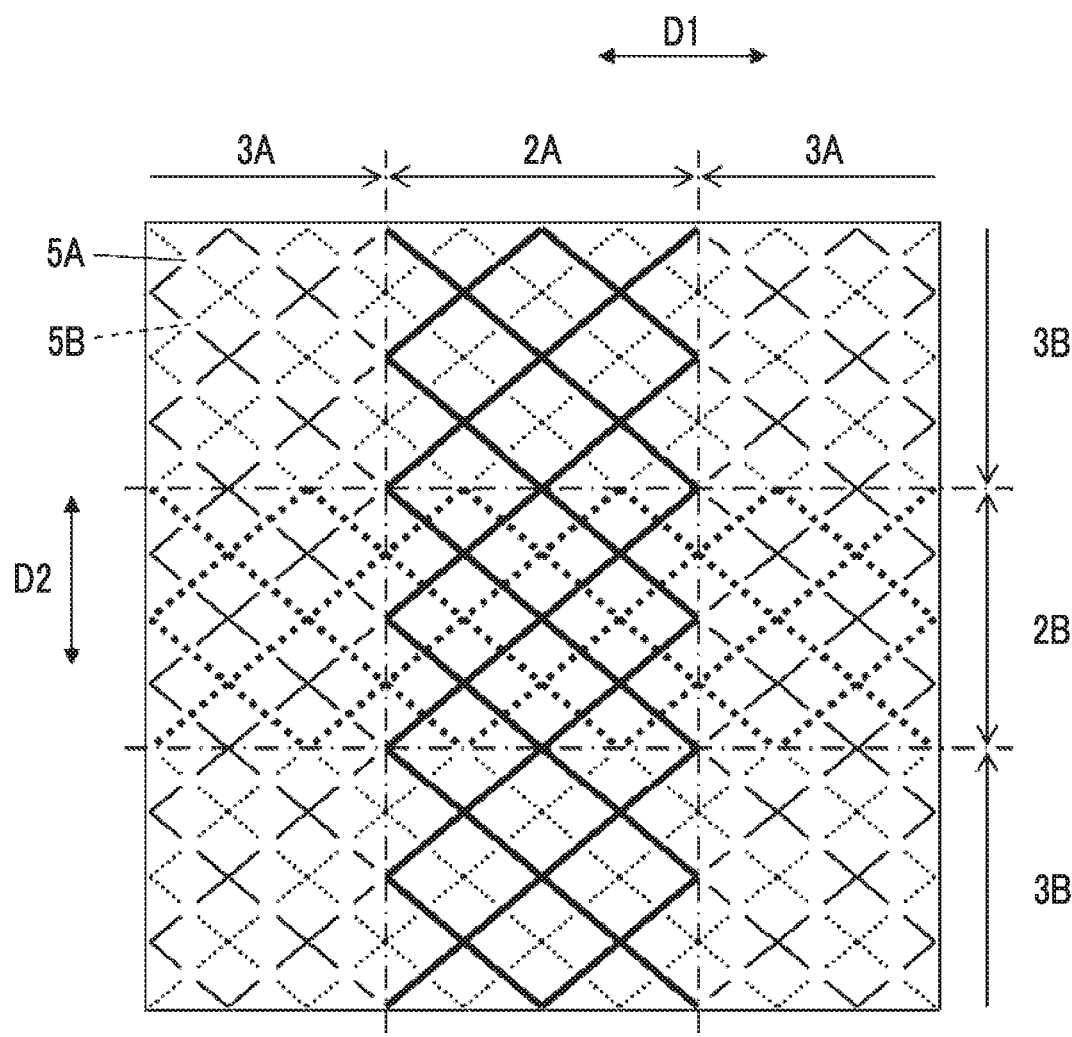
FIG. 13 is a partially enlarged cross-sectional view of the conductive member as the example of the related art.

On the other hand, in a conductive member of the related art having a configuration as shown in FIG. 13, the plurality of disconnection portions 5A of the first dummy electrode 3A and the plurality of disconnection portions 5B of the second dummy electrode 3B were overlapped with each other, and thus the portion was conspicuously visually recognized. However, in the conductive member 13 according to Embodiment 1 of the present invention, the disconnection portion GB1 of the first dummy electrode DE1 and the disconnection portion GB2 of the second dummy electrode DE2 are not overlapped with each other, and thus there is no place which is conspicuously visually recognized by overlapping the disconnection portion GB1 with the disconnection portion GB2. Thereby, in a case where the conductive member 13 is used for the touch panel 11, a visibility can be improved.

Here, "a visibility can be improved" means that in a case where an image of a display device (not shown) is visually recognized through the conductive member 13, the image is more clearly visually recognized without being conscious of the presence of the disconnection portion formed in the fine metal wire included in the first electrode layer 16A and the second electrode layer 16B.

Furthermore, in Embodiment 1 of the present invention, in the fourth region R4, all the disconnection portions GB1 of the first dummy electrode DE1 are overlapped with the fine metal wire which is not the disconnection portion GB2 of the second dummy electrode DE2 and is continuous and all the disconnection portions GB2 of the second dummy electrode DE2 are overlapped with the fine metal wire which is not the disconnection portion GB1 of the first dummy electrode DE1 and is continuous. However, even in a case where all the disconnection portions are not overlapped with the continuous fine metal wire, a visibility in a case where the conductive member 13 is used for the touch panel 11 can be improved. For example, the first dummy electrode DE1 and the second dummy electrode DE2 can be arranged such that at least one point where the disconnection portion of one of the first dummy electrode DE1 and the second dummy electrode DE2 is overlapped with the fine metal wire which is not the disconnection portion of the other of the first dummy electrode DE1 and the second dummy electrode DE2 exists. In this case, compared to the conductive member of the related art as shown in FIG. 13, the number of places where the disconnection portions GB1 of the first dummy electrode DE1 and the disconnection portions GB2 of the second dummy electrode DE2 are overlapped with each other is reduced, and thus the number of places which are conspicuously visually recognized can be reduced and a visibility in a case where the conductive member 13 is used for the touch panel 11 can be improved. Moreover, the point where the disconnection portion of one of the first dummy electrode DE1 and the second dummy electrode DE2 is overlapped with the fine metal wire which is not the disconnection portion of the other of the first dummy electrode DE1 and the second dummy electrode DE2 means a point where a line connecting both end parts of the fine metal wire with a straight line in one disconnection portion and the fine metal wire which is not the other disconnection portion and is continuous are intersected and overlapped with each other.

In addition, from a viewpoint of a visibility, in the fourth region R4, the number of points where the disconnection portion of one of the first dummy electrode DE1 and the second dummy electrode DE2 is overlapped with the fine metal wire which is not the disconnection portion of the other of the first dummy electrode DE1 and the second dummy electrode DE2 is preferably 50% or more, more preferably 90% or more, and most preferably 100% with respect to the number of the disconnection portions of the one of the first dummy electrode DE and the second dummy electrode DE2.

Furthermore, in Embodiment 1 of the present invention, each of the first mesh pattern MP1 formed in the first sensing electrode SE1 and the first dummy electrode DE1 and the second mesh pattern MP2 formed in the second sensing electrode SE2 and the second dummy electrode DE2 is constituted by a rhombic mesh, but is not limited to the rhombic mesh. That is, the first mesh cell C1 included in the first sensing electrode SE1 and the first dummy electrode DE1 and the second mesh cell C2 included in the second sensing electrode SE2 and the second dummy electrode DE2 can be formed as a regular hexagon, a regular triangle, a quadrangle such as a parallelogram, and other polygonal shapes, other than the rhombus. Moreover, each side of the mesh cell may not have a straight-line shape, and may have a wavy line shape. However, a shape of the third mesh cell C3 formed by combining the first mesh pattern MP1 and the second mesh pattern MP2 with each other is preferably a quadrangle and more preferably a rhombus, from a viewpoint of reducing moire with a display device. In a case where the shape of the third mesh cell C3 is a rhombus, an acute angle of the rhombus is preferably 20 degrees to 70 degrees and a length of one side of the rhombus is preferably 100 μm to 300 μm.

In addition, the first sensing electrode SE1, the first dummy electrode DE1, the second sensing electrode SE2, and the second dummy electrode DE2 are constituted by a rhombic mesh having a fixed type of regular pattern, but are not limited thereto, and may be constituted by a mesh having an irregular pattern. In this case, it is possible to make the plurality of mesh cells included in the first sensing electrode SE1, the first dummy electrode DE1, the second sensing electrode SE2, and the second dummy electrode DE2 as a mesh cell of a polygonal shape, particularly, a quadrangular shape or a parallelogram shape having a length of an irregular side of −10% to +10% with respect to an average value of lengths of sides of the respective mesh cells.

In addition, in this case, the first mesh pitch Pt in the plurality of first sensing electrodes SE1 and the plurality of first dummy electrodes DE1 can be determined by an average value of distances in the first direction D1 between centroids of the first mesh cells C1 adjacent to each other in the first direction D1. Moreover, the second mesh pitch P2 in the plurality of second sensing electrodes SE2 and the plurality of second dummy electrodes DE2 can be determined by an average value of distances in the second direction D2 between centroids of the second mesh cells C2 adjacent to each other in the second direction D2.

With such a configuration, it is possible to suppress moire with a pixel pattern of a display device (not shown) in the touch panel 11 and reduce color noise.

In addition, in a case where the plurality of first sensing electrodes SE1, the plurality of first dummy electrodes DE1, the plurality of second sensing electrodes SE2, and the plurality of second dummy electrodes DE2 are constituted by the mesh having an irregular pattern, and an average value of lengths of sides of the plurality of mesh cells and a mesh pitch thereof are calculated, the average value of the lengths of sides and the mesh pitch with respect to the mesh cells arranged in a region having a predetermined area can be calculated. For example, it is possible to calculate the average value of the lengths of sides and the mesh pitch with respect to the plurality of mesh cells arranged in a 10 mm×10 mm region.

Furthermore, each of the plurality of first mesh cells C1 included in the plurality of first sensing electrodes SE1 and the plurality of first dummy electrodes DE1, the plurality of second mesh cells C2 included in the plurality of second sensing electrodes SE2 and the plurality of second dummy electrodes DE2, and the plurality of third mesh cells C3 included in the third mesh pattern MP3 formed by overlapping the first electrode layer 16A and the second electrode layer 16B with each other can have a random shape.

Moreover, in order to improve insulation properties of the first dummy electrode DE1 and the second dummy electrode DE2, each of the plurality of first mesh cells C1 constituting the first dummy electrode DE1 and the plurality of second mesh cells C2 constituting the second dummy electrode DE2 preferably has two or more disconnection portions. In particular, from a viewpoint of improving insulation properties, the disconnection portion is more preferably provided on each of respective sides of the plurality of first mesh cells C1 constituting the first dummy electrode DE1 and respective sides of the plurality of second mesh cells C2 constituting the second dummy electrode DE2 in the portion T2 of FIG. 3 and the portion T4 of FIG. 4 corresponding to the fourth region R4 in FIG. 5.

Embodiment 2

In Embodiment 1, the disconnection portion GB1 provided in the first mesh cell C1 of the first dummy electrode DE1 and the disconnection portion GB2 provided in the second mesh cell C2 of the second dummy electrode DE2 are respectively provided at the midpoint of the side of the first mesh cell C1 and the midpoint of the side of the second mesh cell C2, but the present invention is not limited to the embodiment.

Figure 6:
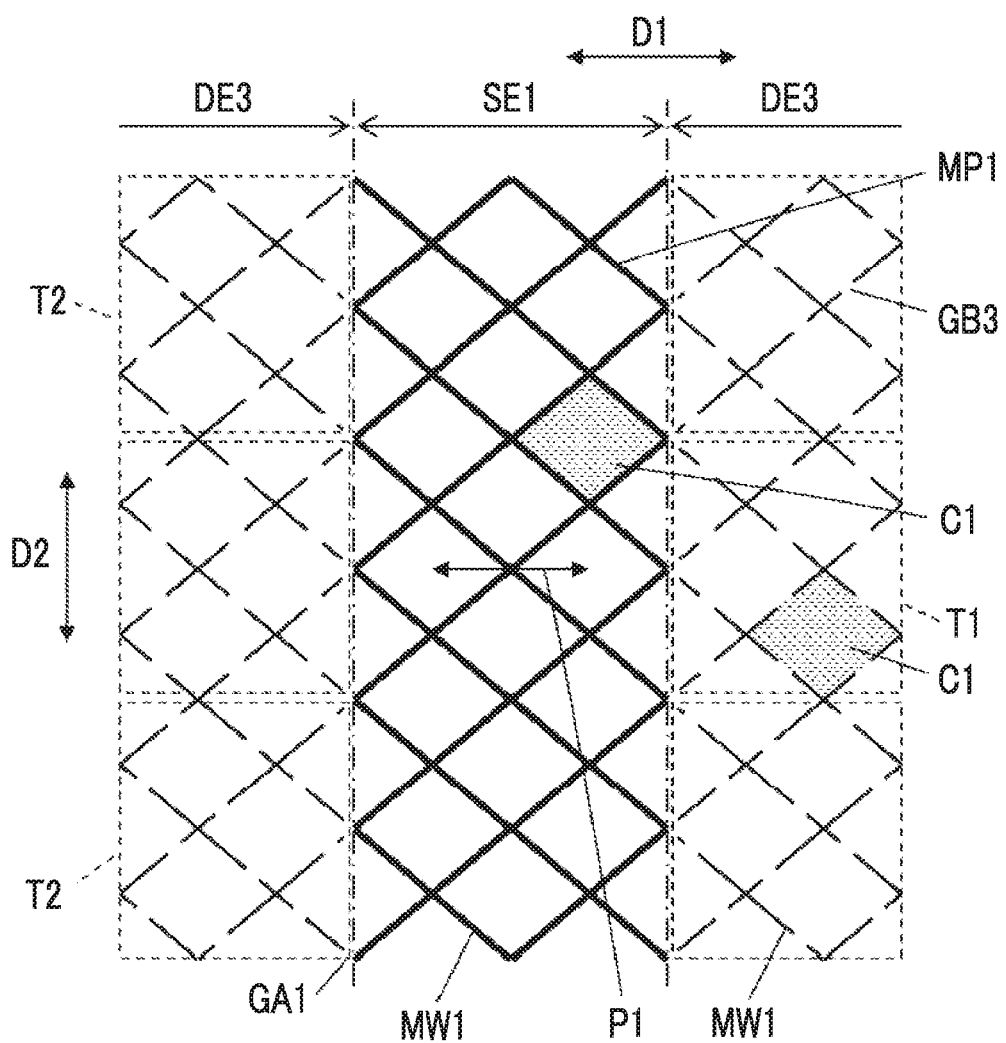
FIG. 6 is a partially enlarged plan view of a first electrode layer in Embodiment 2 of the present invention.

FIG. 6 shows a partial plan view of a first electrode layer in Embodiment 2 viewed from the viewing side in plan view. As shown in FIG. 6, a first dummy electrode DE3 constituted by the fine metal wire MW1 is formed adjacent to the first sensing electrode SE1. Here, the first electrode layer in Embodiment 2 is obtained by forming a plurality of first dummy electrodes DE3 instead of the plurality of first dummy electrodes DE1 in the first electrode layer 16A in Embodiment 1 shown in FIG. 2.

Furthermore, for the explanation, in FIG. 6, the fine metal wires MW1 of the first sensing electrode SE1 are drawn by relatively thick solid lines, the fine metal wires MW1 of the first dummy electrode DE3 are drawn by relatively thin solid lines, but in practice, as the fine metal wires MW of the first sensing electrode SE1 and the fine metal wires MW1 of the first dummy electrode DE3, fine metal wires MW1 having the same line width can be used.

Similarly to the first dummy electrode DE1 of Embodiment 1 shown in FIG. 3, the first dummy electrode DE3 has a mesh shape which is constituted by the fine metal wire MW1 and has the rhombic first mesh cell C1 as a repeating unit, but the first dummy electrode DE3 is disposed with a gap GA1 so as to be electrically insulated from the first sensing electrode SE1, and, although not shown, is also disposed so as to be electrically insulated from the plurality of first electrode pads 21, the plurality of first edge part wires 22, and the plurality of first external connection terminals 23, and thus the first dummy electrode DE3 does not contribute to detection of a touch operation.

In addition, each of the plurality of first mesh cells C1 constituting the mesh shape of the first dummy electrode DE3 has a disconnection portion GB3 where the fine metal wire MW1 is discontinuous.

As shown in FIG. 6, in a portion T1 where the first dummy electrode DE3 and the second sensing electrode SE2 are overlapped with each other, the first mesh cell C1 has the disconnection portion GB3 on all sides and the disconnection portion GB3 is positioned at a midpoint of a side of the first mesh cell C1. Also in a portion T2 where the first dummy electrode DE3 and a second dummy electrode DE4, which will be described later, are overlapped with each other, the first mesh cell C1 has the disconnection portion GB3 on all sides but the disconnection portion GB3 is positioned at a place other than the midpoint of the side of the first mesh cell C1. That is, a disposition of a plurality of disconnection portions GB3 formed in the first dummy electrode DE3 in the portion T1 where the first dummy electrode DE3 and the second sensing electrode SE2 are overlapped with each other is different from a disposition of a plurality of disconnection portions GB3 formed in the first dummy electrode DE3 in the portion T2 where the first dummy electrode DE3 and the second dummy electrode DE4 are overlapped with each other.

Here, similarly to the length of the disconnection portion GB3 provided at the midpoint of the side of the first mesh cell C1, a length of the disconnection portion GB3 provided at a portion other than the midpoint of the side of the first mesh cell C1 in the plurality of first dummy electrodes DE3 is preferably 0.5 µm to 50 µm, more preferably 1 µm to 30 µm, and even more preferably 5 µm to 20 µm. From a viewpoint of a visibility, the length of the disconnection portion GB3 provided at a portion other than the midpoint of the side of the first mesh cell C1 in the portion T2 is preferably shorter than the length of the disconnection portion GB3 provided at the midpoint of the side of the first mesh cell C1 in the portion T1. Moreover, the length of the disconnection portion GB3 provided at a portion other than the midpoint of the side of the first mesh cell C1 in the portion T2 is more preferably ⅔ or less and even more preferably ½ or less, of the length of the disconnection portion GB3 provided at the midpoint of the side of the first mesh cell C1 in the portion T1.

As described above, similarly to the first sensing electrode SE1 and the first dummy electrode DE1 of Embodiment 1 shown in FIG. 3, each of the first sensing electrode SE1 and the first dummy electrode DE3 in Embodiment 2 has the first mesh cell C1, and thus a first mesh pattern MP1 is formed by the plurality of first sensing electrodes SE1 and the plurality of first dummy electrodes DE3.

Figure 7:
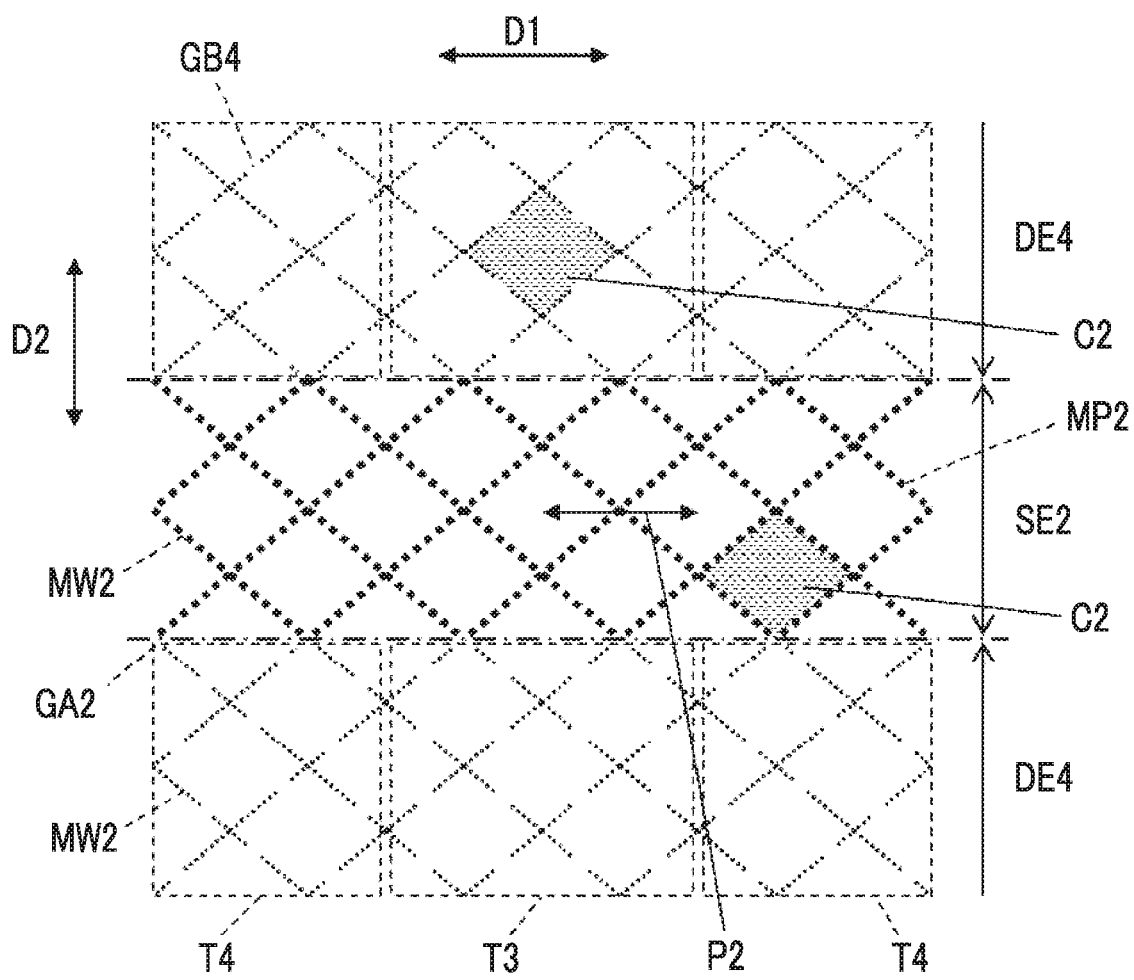
FIG. 7 is a partially enlarged plan view of a second electrode layer in Embodiment 2 of the present invention.

FIG. 7 shows a partial plan view of a second electrode layer in Embodiment 2 viewed from the viewing side in plan view. As shown in FIG. 7, a second dummy electrode DE4 constituted by the fine metal wire MW2 is formed adjacent to the second sensing electrode SE2. Here, the second electrode layer in Embodiment 2 is obtained by forming the plurality of second dummy electrodes DE4 instead of the plurality of second dummy electrodes DE2 in the second electrode layer 16B in Embodiment 1 shown in FIG. 2.

Furthermore, for the explanation, in FIG. 7, the fine metal wires MW2 of the second sensing electrode SE2 are drawn by relatively thick dotted lines, the fine metal wires MW2 of the second dummy electrode DE4 are drawn by relatively thin dotted lines, but in practice, the fine metal wires MW2 of the second sensing electrode SE2 and the fine metal wires MW2 of the second dummy electrode DE4 are formed with continuous fine metal wires MW2 and fine metal wires MW2 having the same line width can be used.

Similarly to the second dummy electrode DE2 of Embodiment 1 shown in FIG. 4, the second dummy electrode DE4 has a mesh shape which is constituted by the fine metal wire MW2 and has the rhombic second mesh cell C2 as a repeating unit, but the second dummy electrode DE4 is disposed with a gap GA2 so as to be electrically insulated from the second sensing electrode SE2, and, although not shown, is also disposed so as to be electrically insulated from the plurality of second electrode pads 31, the plurality of second edge part wires 32, and the plurality of second external connection terminals 33, and thus the second dummy electrode DE4 does not contribute to detection of a touch operation.

In addition, each of the plurality of second mesh cells C2 constituting the mesh shape of the second dummy electrode DE4 has a disconnection portion GB4 where the fine metal wire MW2 is discontinuous.

As shown in FIG. 7, in a portion T3 where the second dummy electrode DE4 and the first sensing electrode SE1 are overlapped with each other, the second mesh cell C2 has the disconnection portion GB4 on all sides and the disconnection portion GB4 is positioned at a midpoint of a side of the second mesh cell C2. Moreover, also in a portion T4 where the second dummy electrode DE4 and the first dummy electrode DE3 are overlapped with each other, the second mesh cell C2 has the disconnection portion GB4 on all sides but the disconnection portion GB4 is positioned at a place other than the midpoint of the side of the second mesh cell C2. That is, a disposition of a plurality of disconnection portions GB4 formed in the second dummy electrode DE4 in the portion T3 where the second dummy electrode DE4 and the first sensing electrode SE3 are overlapped with each other is different from a disposition of a plurality of disconnection portions GB4 formed in the second dummy electrode DE4 in the portion T4 where the second dummy electrode DE4 and the first dummy electrode DE3 are overlapped with each other.

In addition, similarly to the length of the disconnection portion GB4 provided at the midpoint of the side of the second mesh cell C2, a length of the disconnection portion GB4 provided at a portion other than the midpoint of the side of the second mesh cell C2 in the plurality of second dummy electrodes DE4 is preferably 0.5 µm to 50 µm, more preferably 1 µm to 30 µm, and even more preferably 5 µm to 20 µm. From a viewpoint of a visibility, the length of the disconnection portion GB4 provided at a portion other than the midpoint of the side of the second mesh cell C2 in the portion T4 is preferably shorter than the length of the disconnection portion GB4 provided at the midpoint of the side of the second mesh cell C2 in the portion T3. Moreover, the length of the disconnection portion GB4 provided at a portion other than the midpoint of the side of the second mesh cell C2 in the portion T4 is more preferably ⅔ or less and even more preferably ½ or less, of the length of the disconnection portion GB4 provided at the midpoint of the side of the second mesh cell C2 in the portion T3.

As described above, similarly to the second sensing electrode SE2 and the second dummy electrode DE2 of Embodiment 1 shown in FIG. 4, each of the second sensing electrode SE2 and the second dummy electrode DE4 in Embodiment 2 has the second mesh cell C2, and thus a second mesh pattern MP2 is formed by the plurality of second sensing electrodes SE2 and the plurality of second dummy electrodes DE4.

Figure 8:
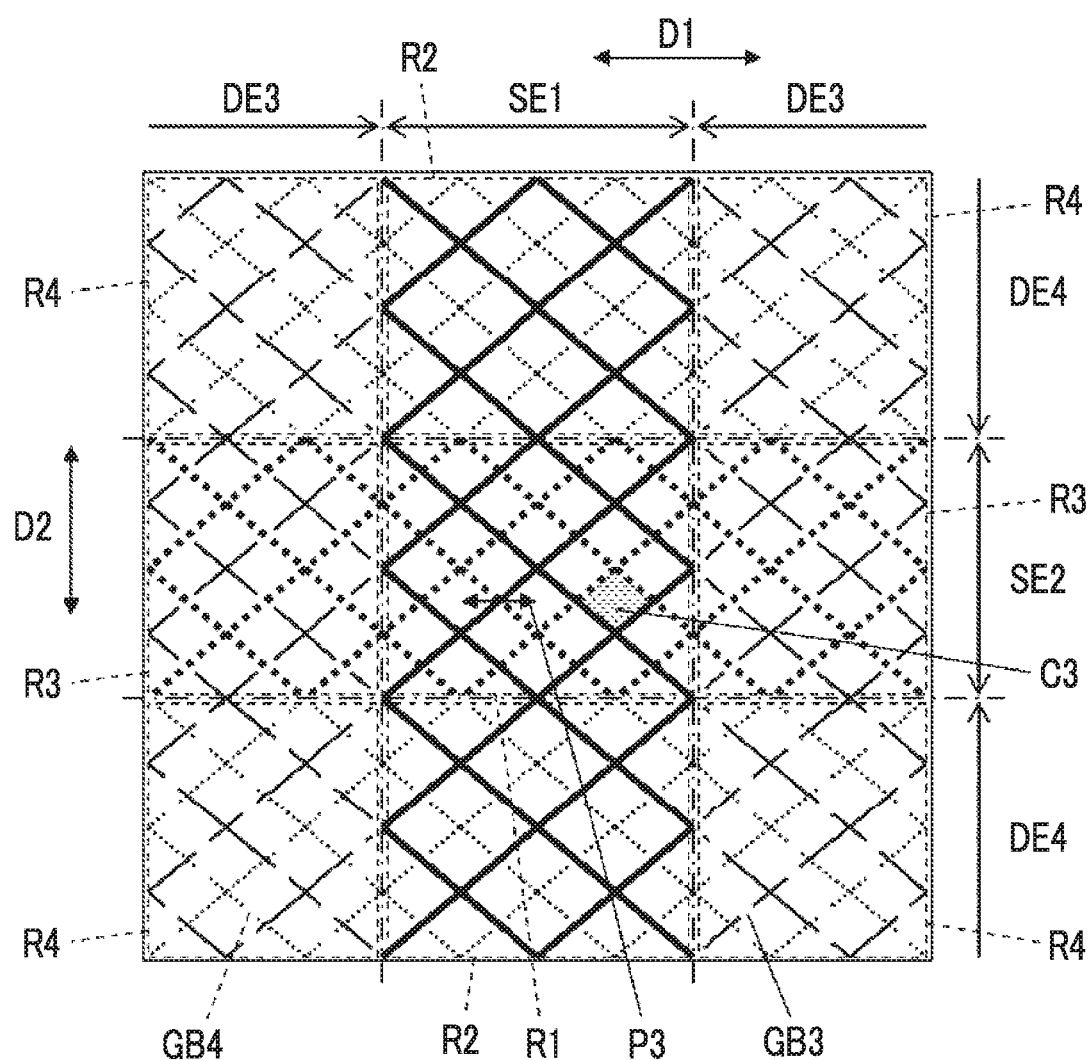
FIG. 8 is a partially enlarged plan view of a conductive member according to Embodiment 2 of the present invention.

FIG. 8 shows a partial plan view of a conductive member according to Embodiment 2 viewed from the viewing side in plan view. In the embodiment shown in FIG. 8, the first mesh cell C1 and the second mesh cell C2 have the same rhombic shape. At this time, similarly to the touch panel 11 according to Embodiment 1 shown in FIG. 5, the plurality of first sensing electrodes SE1 and the plurality of first dummy electrodes DE3 are overlapped with the plurality of second sensing electrodes SE2 and the plurality of second dummy electrodes DE4 to form a third mesh pattern MP3 constituted by a plurality of third mesh cells C3. The third mesh cell C3 is also rhombic.

As described above, also in the conductive member according to Embodiment 2, similarly to the conductive member 13 according to Embodiment 1 shown in FIG. 5, the plurality of first sensing electrodes SE1 and the plurality of first dummy electrodes DE3 are overlapped with the plurality of second sensing electrodes SE2 and the plurality of second dummy electrodes DE4 to form the third mesh pattern MP3. Therefore, it is possible to reduce a parasitic capacitance in an electrode intersection portion and prevent the fine metal wires MW1 included in the first electrode layer and the fine metal wires MW2 included in the second electrode layer from being conspicuously visually recognized.

In addition, as shown in FIG. 8, similarly to the first region R1 to the fourth region R4 in Embodiment 1 shown in FIG. 5, by a combination relating to overlapping of the first sensing electrode SE1, the first dummy electrode DE3, the second sensing electrode SE2, and the second dummy electrode DE4, the region can be divided into four types of regions, which are a first region R1, a second region R2, a third region R3, and a fourth region R4. Here, the first region R1 is a region where the first sensing electrode SE1 and the second sensing electrode SE2 are overlapped with each other, the second region R2 is a region where the first sensing electrode SE1 and the second dummy electrode DE4 are overlapped with each other, the third region R3 is a region where the first dummy electrode DE3 and the second sensing electrode SE2 are overlapped with each other, and the fourth region R4 is a region where the first dummy electrode DE3 and the second dummy electrode DE4 are overlapped with each other.

Furthermore, the second region R2 corresponds to the portion T3 shown in FIG. 7, the third region R3 corresponds to the portion T1 shown in FIG. 6, and the fourth region R4 corresponds to the portion T2 shown in FIG. 6 and the portion T4 shown in FIG. 7.

In a case where the conductive member according to Embodiment 2 is viewed from the viewing side, in the first region R1, the fine metal wire MW1 constituting the first sensing electrode SE1 and the fine metal wire MW2 constituting the second sensing electrode SE2 are intersected and overlapped with each other.

Moreover, in the second region R2, the disconnection portion GB4 of the second dummy electrode DE4 is formed at a midpoint of a side of the second mesh cell C2, and is disposed at a position intersecting with the fine metal wire MW1 constituting the first sensing electrode SE1.

Furthermore, in the third region R3, the disconnection portion GB3 of the first dummy electrode DE3 is formed at a midpoint of a side of the first mesh cell C1, and is disposed at a position intersecting with the fine metal wire MW2 constituting the second sensing electrode SE2.

In addition, in the fourth region R4, each of the disconnection portion GB3 of the first dummy electrode DE3 and the disconnection portion GB4 of the second dummy electrode DE4 is disposed at a position other than the position where the fine metal wire MW1 of the first dummy electrode DE3 and the fine metal wire MW2 of the second dummy electrode DE4 are intersected with each other. That is, the plurality of disconnection portions GB3 provided in the first dummy electrode DE3 and the plurality of disconnection portions GB4 provided in the second dummy electrode DE4 are disposed at different positions from each other and thus are not overlapped with each other. Therefore, the conductive member according to Embodiment 2 does not have a place which is conspicuously visually recognized by overlapping the disconnection portion GB3 of the first dummy electrode DE3 with the disconnection portion GB4 of the second dummy electrode DE4. Thereby, in a case where the conductive member according to Embodiment 2 is used for a touch panel, a visibility can be improved.

Furthermore, since in the fourth region R4 in Embodiment 2, the plurality of disconnection portions GB3 of the first dummy electrode DE3 and the plurality of disconnection portions GB4 of the second dummy electrode DE4 are provided at the midpoint of the side of the first mesh cell C1 and a portion other than the midpoint of the side of the second mesh cell C2, the fine metal wire MW1 of the first dummy electrode DE3 and the fine metal wire MW2 of the second dummy electrode DE4 are intersected and overlapped with each other at all places where the first mesh pattern MP1 and the second mesh pattern MP2 are intersected with each other.

The present invention is not limited to such an embodiment, and for example, in the fourth region R4, at least one of the plurality of disconnection portions GB3 of the first dummy electrode DE3 or the plurality of disconnection portions GB4 of the second dummy electrode DE4 can be provided at a portion other than midpoints of sides of the first mesh cell C1 and the second mesh cell C2. Thereby, at least one point where the fine metal wire MW1 which is not the disconnection portion GB3 of the first dummy electrode DE3 and is continuous and the fine metal wire MW2 which is not the disconnection portion GB4 of the second dummy electrode DE4 and is continuous are intersected and overlapped with each other can exist. In this case, compared to the conductive member of the related art as shown in FIG. 13, the number of places where the disconnection portions GB3 of the first dummy electrode DE3 and the disconnection portions GB4 of the second dummy electrode DE4 are overlapped with each other is reduced, and thus the number of places which are conspicuously visually recognized can be reduced and a visibility in a case where the conductive member according to Embodiment 2 is used for the touch panel can be improved.

In addition, from a viewpoint of a visibility, in the fourth region R4, the number of points where the fine metal wire MW1 which is not the disconnection portion GB3 of the first dummy electrode DE3 and is continuous and the fine metal wire MW2 which is not the disconnection portion GB4 of the second dummy electrode DE4 and is continuous are intersected and overlapped with each other is preferably 50% or more, more preferably 900/o or more, and most preferably 100% with respect to the number of intersection portions between the fine metal wire MW1 of the first dummy electrode DE3 and the fine metal wire MW2 of the second dummy electrode DE4.

Moreover, in order to improve insulation properties of the first dummy electrode DE3 and the second dummy electrode DE4, each of the plurality of first mesh cells C1 constituting the first dummy electrode DE3 and the plurality of second mesh cells C2 constituting the second dummy electrode DE4 preferably has two or more disconnection portions. In particular, from a viewpoint of improving insulation properties, the disconnection portion is more preferably provided on each of respective sides of the plurality of first mesh cells C1 constituting the first dummy electrode DE3 and respective sides of the plurality of second mesh cells C2 constituting the second dummy electrode DE4.

It goes without saying that in the fourth region R4, the disposition of the plurality of disconnection portions formed in the first dummy electrode may be a disposition in which the disposition of the plurality of disconnection portions GB1 formed in the first dummy electrode DE1 in Embodiment 1 is mixed with the disposition of the plurality of disconnection portions GB3 formed in the first dummy electrode DE3 in Embodiment 2. That is, in the first dummy electrode in the fourth region R4, the disconnection portion may be formed at the midpoints of some sides of the first mesh cell C1 and the place other than the midpoint of the side of the first mesh cell C1. Similarly, in the fourth region R4, the disposition of the plurality of disconnection portions formed in the second dummy electrode may be a disposition in which the disposition of the plurality of disconnection portions GB2 formed in the second dummy electrode DE2 in Embodiment 1 is mixed with the disposition of the plurality of disconnection portions GB4 formed in the second dummy electrode DE4 in Embodiment 2.

In addition, although not described in Embodiment 1 and Embodiment 2, the disconnection portion may be provided in the fine metal wire MW1 in the first sensing electrode SE1 and the fine metal wire MW2 in the second sensing electrode SE2 as necessary for resistance adjustment or the like. At this time, the disconnection portion of the fine metal wire formed in one sensing electrode of the first sensing electrode SE1 and the second sensing electrode SE2 is preferably disposed so as not to be overlapped with the disconnection portion of the fine metal wire formed in the other sensing electrode in plan view:

Furthermore, in Embodiment 1 and Embodiment 2 of the present invention, the first electrode layer 16A is formed on the first surface 15A of the transparent insulating substrate 15 which is a transparent insulating member and the second electrode layer 16B is formed on the second surface 15B of the transparent insulating substrate 15. However, as long as the first electrode layer 16A and the second electrode layer 16B are insulated from each other, the present invention is not limited to the embodiments.

Figure 9:
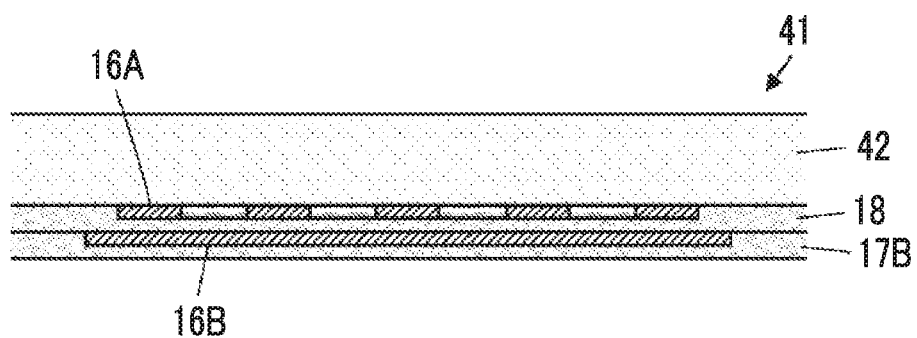
FIG. 9 is a partial cross-sectional view of a touch panel according to a modification example of Embodiment 1 of the present invention.

FIG. 9 shows a partial cross-sectional view of a touch panel 41 according to a modification example of Embodiment 1 of the present invention. In the modification example shown in FIG. 9, the first electrode layer 16A is formed on a transparent insulating substrate 42 made of tempered glass, and a transparent insulating interlayer 18 is formed so as to cover the first electrode layer 16A. Moreover, the second electrode layer 16B is formed on the transparent insulating interlayer 18, and the protective layer 17B is formed so as to cover the second electrode layer 16B. In this case, the transparent insulating interlayer 18 covering the first electrode layer 16A serves as a "transparent insulating member" interposed between the first electrode layer 16A and the second electrode layer 16B, and the first electrode layer 16A and the second electrode layer 16B are insulated from each other by the presence of the transparent insulating member. In the modification example shown in FIG. 9, the transparent insulating substrate 42 can be used as the cover panel 12 shown in FIG. 1.

Figure 10:
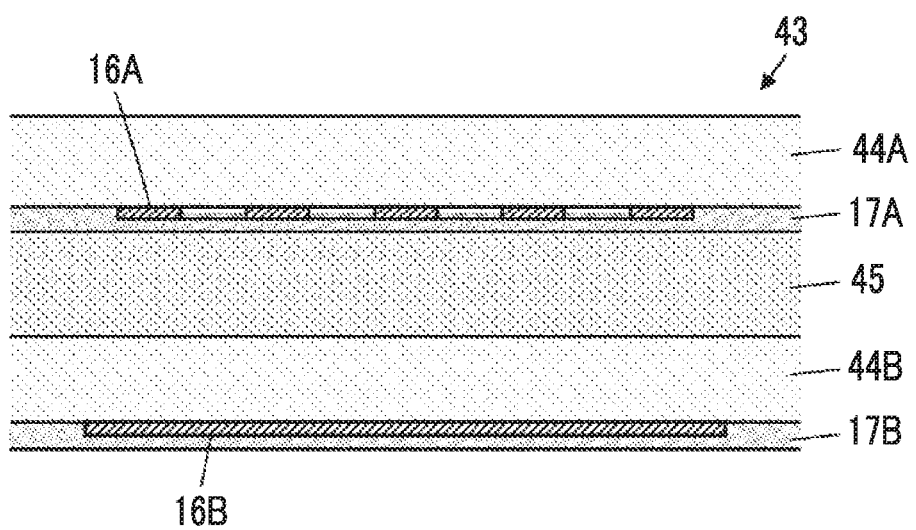
FIG. 10 is a partial cross-sectional view of a touch panel according to another modification example of Embodiment 1 of the present invention.
Figure 11:
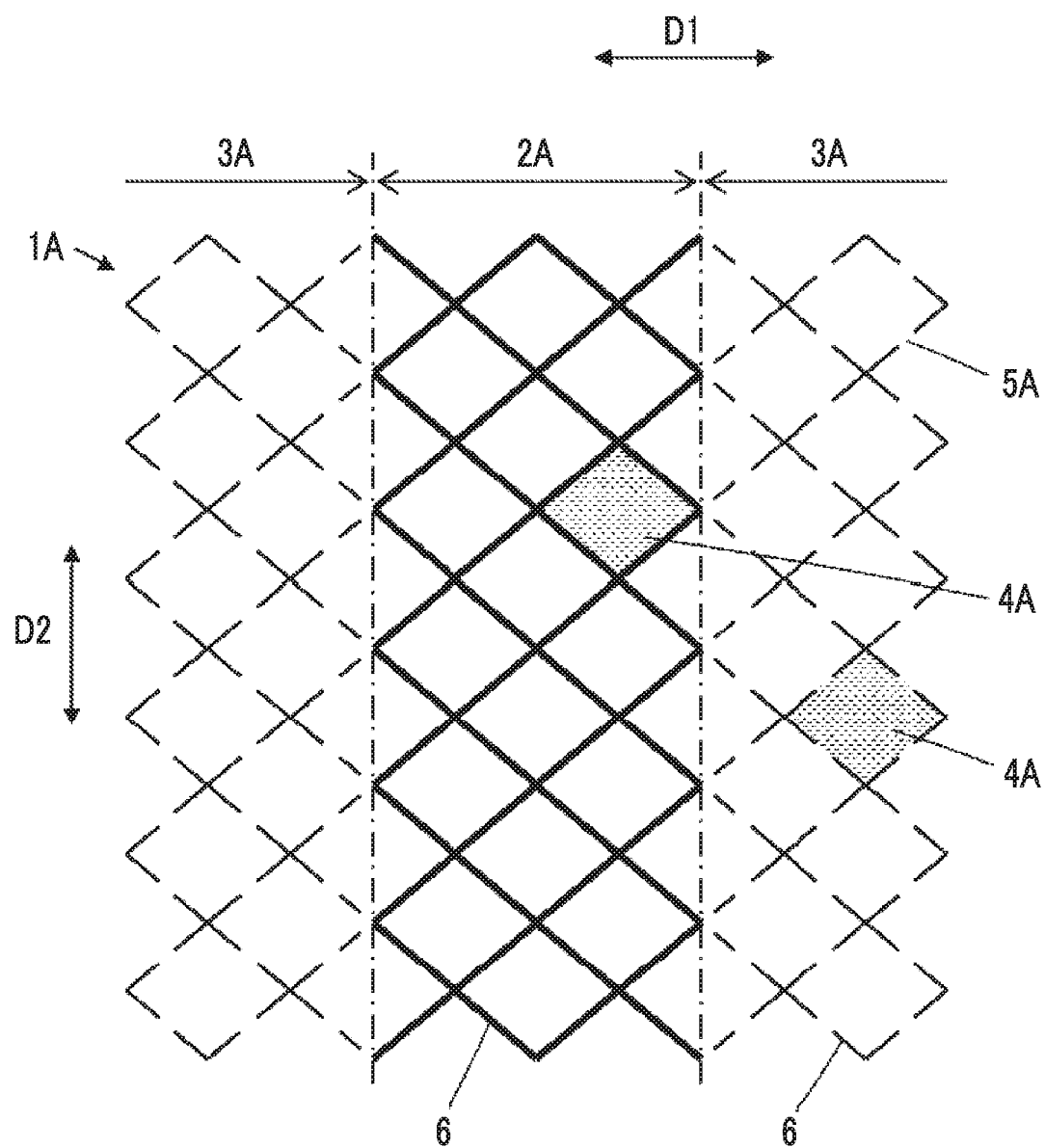
FIG. 11 is a partially enlarged cross-sectional view of a first electrode layer in a conductive member as an example of the related art.
Figure 12:
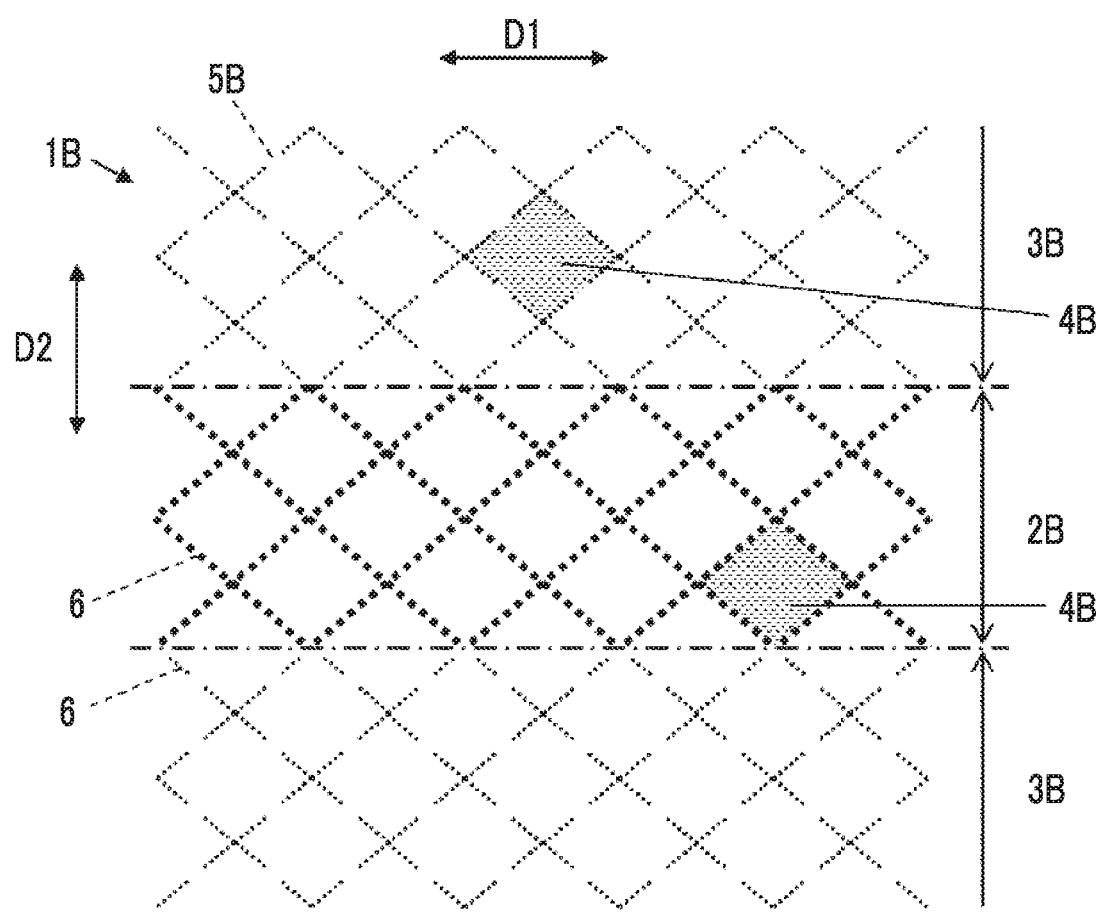
FIG. 12 is a partially enlarged cross-sectional view of a second electrode layer in the conductive member as the example of the related art.

In addition, FIG. 10 shows a partial cross-sectional view of a touch panel 43 according to another modification example of Embodiment 1 of the present invention. In the modification example shown in FIG. 10, the first electrode layer 16A is formed on a first transparent insulating substrate 44A, and the protective layer 17A is formed so as to cover the first electrode layer 16A. Moreover, the second electrode layer 16B is formed on a second transparent insulating substrate 44B, and the protective layer 17B is formed so as to cover the second electrode layer 16B. Furthermore, the protective layer 17A formed on the first transparent insulating substrate 44A and the second transparent insulating substrate 44B adhere to each other via a transparent adhesive layer 45. In this case, the protective layer 17A covering the first electrode layer 16A, the adhesive layer 45, and the second transparent insulating substrate 44B serve as a "transparent insulating member" interposed between the first electrode layer 16A and the second electrode layer 16B, and the first electrode layer 16A and the second electrode layer 16B are insulated from each other by the presence of the transparent insulating member. In the modification example shown in FIG. 10, the first transparent insulating substrate 44A can be used as the cover panel 12 shown in FIG. 1.

Furthermore, the conductive member according to the embodiment of the present invention is not limited to the embodiments shown in FIGS. 9 and 10, and may have any structure as long as the first electrode layer 16A and the second electrode layer 16B are insulated from each other by the presence of the transparent insulating member.

Hereinafter, each member constituting the conductive member 13 according to Embodiment 1 and the conductive member according to Embodiment 2 will be described.

<Transparent Insulating Substrate>

The transparent insulating substrate 15 is not particularly limited as long as the transparent insulating substrate is transparent, has electric insulation properties, and can support the first electrode layer 16A and the second electrode layer 16B. As the material constituting the transparent insulating substrate 15, for example, glass, tempered glass, alkali free glass, polyethylene terephthalate (PET), polyethylene naphthalate (PEN), a cyclo-olefin polymer (COP), a cyclic olefin copolymer (COC), polycarbonate (PC), an acrylic resin, polyethylene (PE), polypropylene (PP), polystyrene (PS), polyvinyl chloride (PVC), polyvinylidene chloride (PVDC), cellulose triacetate (TAC), or the like can be used. A thickness of the transparent insulating substrates 15 is, for example, 20 to 1000 μm and is particularly preferably 30 to 100 μm. A light transmittance of the transparent insulating substrate 15 is preferably 40% to 100%. The light transmittance is measured, for example, by using "Plastics—Determination of total luminous transmittance and reflectance" regulated in JIS K 7375:2008.

<Fine Metal Wire>

The fine metal wires forming the first sensing electrode SE1 and the first dummy electrodes DE1 and DE3 and the fine metal wires forming the second sensing electrode SE2 and the second dummy electrodes DE2 and DE4 are preferably fine metal wires having a line width of 0.5 μm to 10 μm. The line widths of these fine metal wires are more preferably 1.0 μm to 5.0 μm. A material for the fine metal wire is preferably silver, copper, aluminum, gold, molybdenum, chromium, or the like, and can be used in alloys, oxides, or laminates thereof. In particular, silver or copper is preferable from a viewpoint of a resistance value, and for example, a fine metal wire having a laminated structure of molybdenum/aluminum/molybdenum, molybdenum/copper/molybdenum, copper oxide/copper/copper oxide, or the like can be used.

A thickness of the fine metal wire is preferably 0.05 μm to 10 μm and is more preferably 0.1 μm to 1 μm. In order to improve a visibility of the fine metal wire, a blackening layer may be provided on the fine metal wire or between the fine metal wire, the transparent insulating member, and the fine metal wire. As the blackening layer, copper oxide, molybdenum oxide, or the like can be used.

<Protective Layer>

As the transparent protective layers 17A and 17B covering the fine metal wire, an organic film of gelatin, an acrylic resin, a urethane resin, or the like, and an inorganic film of silicon dioxide or the like can be used, and the film thickness thereof is preferably 0.01 µm or more and 10 µm or less.

In addition, as necessary, a transparent coating layer may be formed on the protective layer. As the transparent coating layer, an organic film of an acrylic resin, a urethane resin, or the like is used, and the film thickness thereof is preferably 1 µm or more and 100 µm or less.

In addition, as necessary, the following layers can be additionally provided in the conductive member 13 according to Embodiment 1 and the conductive member according to Embodiment 2.

<Edge Part Wire Insulating Film>

For the purpose of preventing a short circuit between the edge part wires and corrosion of the edge part wire, an edge part wire insulating film may be formed on the first edge part wire 22 and the second edge part wire 32 as shown in FIG. 2. As the edge part wire insulating film, an organic film of an acrylic resin, a urethane resin, or the like is used, and the film thickness thereof is preferably 1 µm or more and 30 µm or less. The edge part wire insulating film may be formed only on any one of the first edge part wire 22 and the second edge part wire 32.

EXPLANATION OF REFERENCES

1A: first electrode layer
1B: second electrode layer
2A, 2B: sensing electrode
3A, 3B: dummy electrode
4: mesh cell
5A, 5B: disconnection portion
6: fine metal wire
11, 41, 43: touch panel
11A: front surface
11B: back surface
12: cover panel
13: conductive member
14: adhesive layer
15, 42: transparent insulating substrate
15A: first surface
15B: second surface
16A: first electrode layer
16B: second electrode layer
17A, 17B: protective layer
18: transparent insulating interlayer
22: first edge part wire
23: first external connection terminal
24: first electrode pad
32: second edge part wire
33: second external connection terminal
34: second electrode pad
44A: first transparent insulating substrate
44B: second transparent insulating substrate
C1: first mesh cell
C2: second mesh cell
C3: third mesh cell
D1: first direction
D2: second direction
DE1, DE3: first dummy electrode
DE2, DE4: second dummy electrode
GA1, GA2: gap
GB1, GB2, GB3, GB4: disconnection portion
MP1: first mesh pattern
MP2: second mesh pattern
MP3: third mesh pattern
MW1, MW2: fine metal wire
P1: first mesh pitch
P2: second mesh pitch
P3: third mesh pitch
R0: region
R1: first region
R2: second region
R3: third region
R4: fourth region
S1: input region
S2: outer region
SE1: first sensing electrode
SE2: second sensing electrode
T1, T2, T3, T4: portion

What is claimed is:

1. A conductive member, comprising:
a first electrode layer and a second electrode layer which are disposed via a transparent insulating member,
wherein the first electrode layer includes a plurality of first sensing electrodes which are arranged in parallel at an interval in a first direction and each extend in a second direction orthogonal to the first direction, and a plurality of first dummy electrodes which are arranged between the plurality of first sensing electrodes and are insulated from the plurality of first sensing electrodes,
the second electrode layer includes a plurality of second sensing electrodes which are arranged in parallel at an interval in the second direction and each extend in the first direction, and a plurality of second dummy electrodes which are arranged between the plurality of second sensing electrodes and are insulated from the plurality of second sensing electrodes,
each of the first sensing electrodes, the first dummy electrodes, the second sensing electrodes, and the second dummy electrodes is constituted by a plurality of mesh cells formed with a fine metal wire,
each of the mesh cells constituting the first dummy electrodes has a disconnection portion where the fine metal wire is discontinuous,
each of the mesh cells constituting the second dummy electrodes has a disconnection portion where the fine metal wire is discontinuous,
a disposition of the disconnection portion of the mesh cell of the first dummy electrode in a region where the first dummy electrode and the second sensing electrode are overlapped with each other is different from a disposition of the disconnection portion of the mesh cell of the first dummy electrode in a region where the first dummy electrode and the second dummy electrode are overlapped with each other,
a disposition of the disconnection portion of the mesh cell of the second dummy electrode in a region where the second dummy electrode and the first sensing electrode are overlapped with each other is different from a disposition of the disconnection portion of the mesh cell of the second dummy electrode in a region where the first dummy electrode and the second dummy electrode are overlapped with each other, and
in plan view,
in a region where the first dummy electrode and the second sensing electrode are overlapped with each other, the fine metal wire of the second sensing electrode is disposed at the disconnection portion of the first dummy electrode, in a region where the second dummy electrode and the first sensing electrode are overlapped with each other, the fine metal wire of the first sensing electrode is disposed at the disconnection portion of the second dummy electrode, and the first dummy electrode and the second dummy electrode are formed such that in a region where the first dummy electrode and the second dummy electrode are overlapped with each other, at least one of a point where the fine metal wire which is not the disconnection portion of the first dummy electrode and is continuous and the fine metal wire which is not the disconnection portion of the second dummy electrode and is continuous are intersected and overlapped with each other or a point where the fine metal wire which is not the disconnection portion of one of the first dummy electrode and the second dummy electrode and is continuous is disposed at the disconnection portion of the other of the first dummy electrode and the second dummy electrode exists.

2. The conductive member according to claim 1, wherein in a region where the first dummy electrode and the second dummy electrode are overlapped with each other, the fine metal wire of the second dummy electrode is disposed at the disconnection portion of the first dummy electrode and the fine metal wire of the first dummy electrode is disposed at the disconnection portion of the second dummy electrode.

3. The conductive member according to claim 1, wherein in a region where the first dummy electrode and the second dummy electrode are overlapped with each other, the disconnection portion of the first dummy electrode and the disconnection portion of the second dummy electrode are each disposed at positions other than a position where the fine metal wire of the first dummy electrode and the fine metal wire of the second dummy electrode are intersected with each other.

4. The conductive member according to claim 3, wherein a length of the disconnection portion of the first dummy electrode and a length of the disconnection portion of the second dummy electrode in a region where the first dummy electrode and the second dummy electrode are overlapped with each other are shorter than a length of the disconnection portion of the first dummy electrode in a region where the first dummy electrode and the second sensing electrode are overlapped with each other and a length of the disconnection portion of the second dummy electrode in a region where the second dummy electrode and the first sensing electrode are overlapped with each other.

5. The conductive member according to claim 2, wherein a line width of the fine metal wire is 0.5 μm or more and 10 μm or less, and the length of the disconnection portion of the first dummy electrode and the length of the disconnection portion of the second dummy electrode are 1 μm or more and 30 μm or less.

6. The conductive member according to claim 4, wherein a line width of the fine metal wire is 0.5 μm or more and 10 μm or less, and the length of the disconnection portion of the first dummy electrode and the length of the disconnection portion of the second dummy electrode are 1 μm or more and 30 μm or less.

7. The conductive member according to claim 5, wherein the plurality of first sensing electrodes and the plurality of first dummy electrodes form a first mesh pattern constituted by a plurality of first mesh cells, the plurality of second sensing electrodes and the plurality of second dummy electrodes form a second mesh pattern constituted by a plurality of second mesh cells, and in a region where the first electrode layer and the second electrode layer are overlapped with each other, the plurality of first sensing electrodes and the plurality of first dummy electrodes are combined with the plurality of second sensing electrodes and the plurality of second dummy electrodes to form a third mesh pattern constituted by a plurality of third mesh cells.

8. The conductive member according to claim 6, wherein the plurality of first sensing electrodes and the plurality of first dummy electrodes form a first mesh pattern constituted by a plurality of first mesh cells, the plurality of second sensing electrodes and the plurality of second dummy electrodes form a second mesh pattern constituted by a plurality of second mesh cells, and in a region where the first electrode layer and the second electrode layer are overlapped with each other, the plurality of first sensing electrodes and the plurality of first dummy electrodes are combined with the plurality of second sensing electrodes and the plurality of second dummy electrodes to form a third mesh pattern constituted by a plurality of third mesh cells.

9. The conductive member according to claim 7, wherein each of the third mesh cells has a shape of a quadrangle.

10. The conductive member according to claim 8, wherein each of the third mesh cells has a shape of a quadrangle.

11. The conductive member according to claim 9, wherein the quadrangle is a rhombus.

12. The conductive member according to claim 10, wherein the quadrangle is a rhombus.

13. The conductive member according to claim 11, wherein the first mesh cell and the second mesh cell have the same shape as each other, the first mesh pattern has a first mesh pitch, the second mesh pattern has a second mesh pitch which is the same as the first mesh pitch, and the third mesh cell has a third mesh pitch which is ½ of the first mesh pitch.

14. The conductive member according to claim 12, wherein the first mesh cell and the second mesh cell have the same shape as each other, the first mesh pattern has a first mesh pitch, the second mesh pattern has a second mesh pitch which is the same as the first mesh pitch, and the third mesh cell has a third mesh pitch which is ½ of the first mesh pitch.

15. A touch panel using the conductive member according to claim 13.

16. A touch panel using the conductive member according to claim 14.

17. A conductive member, comprising:

a first electrode layer and a second electrode layer which are disposed via a transparent insulating member, wherein the first electrode layer includes a plurality of first sensing electrodes which are arranged in parallel at an interval in a first direction and each extend in a second direction orthogonal to the first direction, and a plurality of first dummy electrodes which are arranged between the plurality of first sensing electrodes and are insulated from the plurality of first sensing electrodes, the second electrode layer includes a plurality of second sensing electrodes which are arranged in parallel at an interval in the second direction and each extend in the first direction, and a plurality of second dummy electrodes which are arranged between the plurality of second sensing electrodes and are insulated from the plurality of second sensing electrodes, each of the first sensing electrodes, the first dummy electrodes, the second sensing electrodes, and the second dummy electrodes is constituted by a plurality of mesh cells formed with a fine metal wire, each of the mesh cells constituting the first dummy electrodes has a disconnection portion where the fine metal wire is discontinuous, each of the mesh cells constituting the second dummy electrodes has a disconnection portion where the fine metal wire is discontinuous, a disposition of the disconnection portion of the mesh cell of the first dummy electrode in a region where the first dummy electrode and the second sensing electrode are overlapped with each other is different from a disposition of the disconnection portion of the mesh cell of the first dummy electrode in a region where the first dummy electrode and the second dummy electrode are overlapped with each other, and a disposition of the disconnection portion of the mesh cell of the second dummy electrode in a region where the second dummy electrode and the first sensing electrode are overlapped with each other is different from a disposition of the disconnection portion of the mesh cell of the second dummy electrode in a region where the first dummy electrode and the second dummy electrode are overlapped with each other.

18. A conductive member, comprising:

a first electrode layer and a second electrode layer which are disposed via a transparent insulating member, wherein the first electrode layer includes a plurality of first sensing electrodes which are arranged in parallel at an interval in a first direction and each extend in a second direction orthogonal to the first direction, and a plurality of first dummy electrodes which are arranged between the plurality of first sensing electrodes and are insulated from the plurality of first sensing electrodes, the second electrode layer includes a plurality of second sensing electrodes which are arranged in parallel at an interval in the second direction and each extend in the first direction, and a plurality of second dummy electrodes which are arranged between the plurality of second sensing electrodes and are insulated from the plurality of second sensing electrodes, each of the first sensing electrodes, the first dummy electrodes, the second sensing electrodes, and the second dummy electrodes is constituted by a plurality of mesh cells formed with a fine metal wire, each of the mesh cells constituting the first dummy electrodes has a disconnection portion where the fine metal wire is discontinuous, each of the mesh cells constituting the second dummy electrodes has a disconnection portion where the fine metal wire is discontinuous, a disposition of the disconnection portion of the mesh cell of the first dummy electrode in a region where the first dummy electrode and the second sensing electrode are overlapped with each other is different from a disposition of the disconnection portion of the mesh cell of the first dummy electrode in a region where the first dummy electrode and the second dummy electrode are overlapped with each other, and in plan view, in a region where the first dummy electrode and the second sensing electrode are overlapped with each other, the fine metal wire of the second sensing electrode is disposed at the disconnection portion of the first dummy electrode, in a region where the second dummy electrode and the first sensing electrode are overlapped with each other, the fine metal wire of the first sensing electrode is disposed at the disconnection portion of the second dummy electrode, and the first dummy electrode and the second dummy electrode are formed such that in a region where the first dummy electrode and the second dummy electrode are overlapped with each other, at least one of a point where the fine metal wire which is not the disconnection portion of the first dummy electrode and is continuous is disposed at the disconnection portion of the second dummy electrode exists.

19. The conductive member according to claim 18, wherein a line width of the fine metal wire is 0.5 μm or more and 10 μm or less, the length of the disconnection portion of the first dummy electrode and the length of the disconnection portion of the second dummy electrode are 1 μm or more and 30 μm or less, the plurality of first sensing electrodes and the plurality of first dummy electrodes form a first mesh pattern constituted by a plurality of first mesh cells, the plurality of second sensing electrodes and the plurality of second dummy electrodes form a second mesh pattern constituted by a plurality of second mesh cells, in a region where the first electrode layer and the second electrode layer are overlapped with each other, the plurality of first sensing electrodes and the plurality of first dummy electrodes are combined with the plurality of second sensing electrodes and the plurality of second dummy electrodes to form a third mesh pattern constituted by a plurality of third mesh cells, each of the third mesh cells has a shape of a rhombus, the first mesh cell and the second mesh cell have the same shape as each other, the first mesh pattern has a first mesh pitch, the second mesh pattern has a second mesh pitch which is the same as the first mesh pitch, and the third mesh cell has a third mesh pitch which is ½ of the first mesh pitch.

* * * * *